US012649107B2

(12) United States Patent (10) Patent No.: US 12,649,107 B2

Miyamoto et al. (45) Date of Patent: Jun. 9, 2026

(54) NON-TRANSITORY COMPUTER-READABLE STORAGE MEDIUM HAVING INFORMATION PROCESSING PROGRAM STORED THEREIN, INFORMATION PROCESSING SYSTEM, AND INFORMATION PROCESSING METHOD

(71) Applicant: Nintendo Co., Ltd., Kyoto (JP)

(72) Inventors: Shigeru Miyamoto, Kyoto (JP); Yuji Kando, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 223 days.

(21) Appl. No.: 18/429,970

(22) Filed: Feb. 1, 2024

(65) Prior Publication Data

US 2024/0261680 A1 Aug. 8, 2024

(30) Foreign Application Priority Data

Feb. 8, 2023 (JP) ................................. 2023-017466

(51) Int. Cl.
| | |
|---|---|
| *A63F 13/5252* | (2014.01) |
| *A63F 13/56* | (2014.01) |
| *A63F 13/92* | (2014.01) |

(52) U.S. Cl.
CPC .......... *A63F 13/5252* (2014.09); *A63F 13/56* (2014.09); *A63F 13/92* (2014.09)

(58) Field of Classification Search
CPC ....... A63F 13/5252; A63F 13/56; A63F 13/92
See application file for complete search history.

(56) References Cited

U.S. PATENT DOCUMENTS

| | | | | |
|---|---|---|---|---|
| 9,327,191 | B2 * | 5/2016 | Miyamoto | ............ A63F 13/335 |
| 9,962,616 | B2 * | 5/2018 | Ye | ........................ A63F 13/2145 |
| 2005/0187015 | A1 | 8/2005 | Suzuki et al. | |
| 2008/0070684 | A1 * | 3/2008 | Haigh-Hutchinson | ...................... A63F 13/426 463/32 |
| 2009/0104990 | A1 | 4/2009 | Tsujino et al. | |
| 2010/0095249 | A1 * | 4/2010 | Yoshikawa | ........... A63F 13/577 345/419 |
| 2011/0018867 | A1 * | 1/2011 | Shibamiya | .............. G06F 3/011 345/619 |

(Continued)

FOREIGN PATENT DOCUMENTS

| | | |
|---|---|---|
| JP | 2005-230263 | 9/2005 |
| JP | 2006-280447 | 10/2006 |

(Continued)

*Primary Examiner* — Malina D. Blaise
(74) *Attorney, Agent, or Firm* — Nixon & Vanderhye PC

(57) ABSTRACT

Executed is processing of: performing first display obtained by taking an image of a virtual space by a virtual camera facing a first camera direction and rendering the virtual space; during the first display, switching to second display representing the virtual space as viewed from above, according to a user operation; during the second display, designating a second camera direction on the basis of a user operation, and switching to the first display according to an operation performed by the user; and during a predetermined period after switching to the first display, changing a direction of the virtual camera from the first camera direction to the second camera direction, taking an image of the virtual space, and rendering the virtual space.

15 Claims, 21 Drawing Sheets

DIRECTION OF PLAYER CHARACTER

PLAYER CHARACTER

VIRTUAL CAMERA

COORDINATE SYSTEM
OF VIRTUAL CAMERA

(56)　　　　　　References Cited

U.S. PATENT DOCUMENTS

| | | | | |
|---|---|---|---|---|
| 2011/0018868 | A1* | 1/2011 | Inoue | H04N 13/279 |
| | | | | 345/419 |
| 2012/0165099 | A1* | 6/2012 | Ito | A63F 13/211 |
| | | | | 463/43 |
| 2012/0214591 | A1* | 8/2012 | Ito | A63F 13/211 |
| | | | | 463/31 |
| 2014/0357358 | A1 | 12/2014 | Shikata et al. | |
| 2018/0104591 | A1* | 4/2018 | Fukuda | G06F 3/0488 |
| 2018/0345146 | A1* | 12/2018 | Okajima | G06F 3/011 |
| 2019/0118078 | A1* | 4/2019 | Li | A63F 13/2145 |
| 2019/0313030 | A1* | 10/2019 | Yamaguchi | H04N 23/695 |
| 2019/0366212 | A1* | 12/2019 | Kusakihara | A63F 13/426 |
| 2020/0353349 | A1* | 11/2020 | Palmer | A63F 13/2145 |
| 2020/0384363 | A1* | 12/2020 | Kyogoku | A63F 13/525 |
| 2021/0058609 | A1* | 2/2021 | Takahashi | G06F 3/012 |
| 2021/0260479 | A1* | 8/2021 | Yang | A63F 13/2145 |
| 2022/0351442 | A1* | 11/2022 | Kondoh | G06F 3/011 |
| 2023/0191255 | A1* | 6/2023 | Iwao | A63F 13/5372 |
| | | | | 463/31 |
| 2024/0082725 | A1* | 3/2024 | Sato | A63F 13/44 |
| 2024/0123359 | A1* | 4/2024 | Tinari | A63F 13/69 |
| 2024/0331253 | A1* | 10/2024 | Yasui | G06F 3/011 |
| 2024/0367050 | A1* | 11/2024 | Iwao | A63F 13/5372 |

FOREIGN PATENT DOCUMENTS

| | | |
|---|---|---|
| JP | 2009-056181 | 3/2009 |
| JP | 2014-235538 | 12/2014 |
| JP | 2019076721 A | 5/2019 |

* cited by examiner

F I G. 1
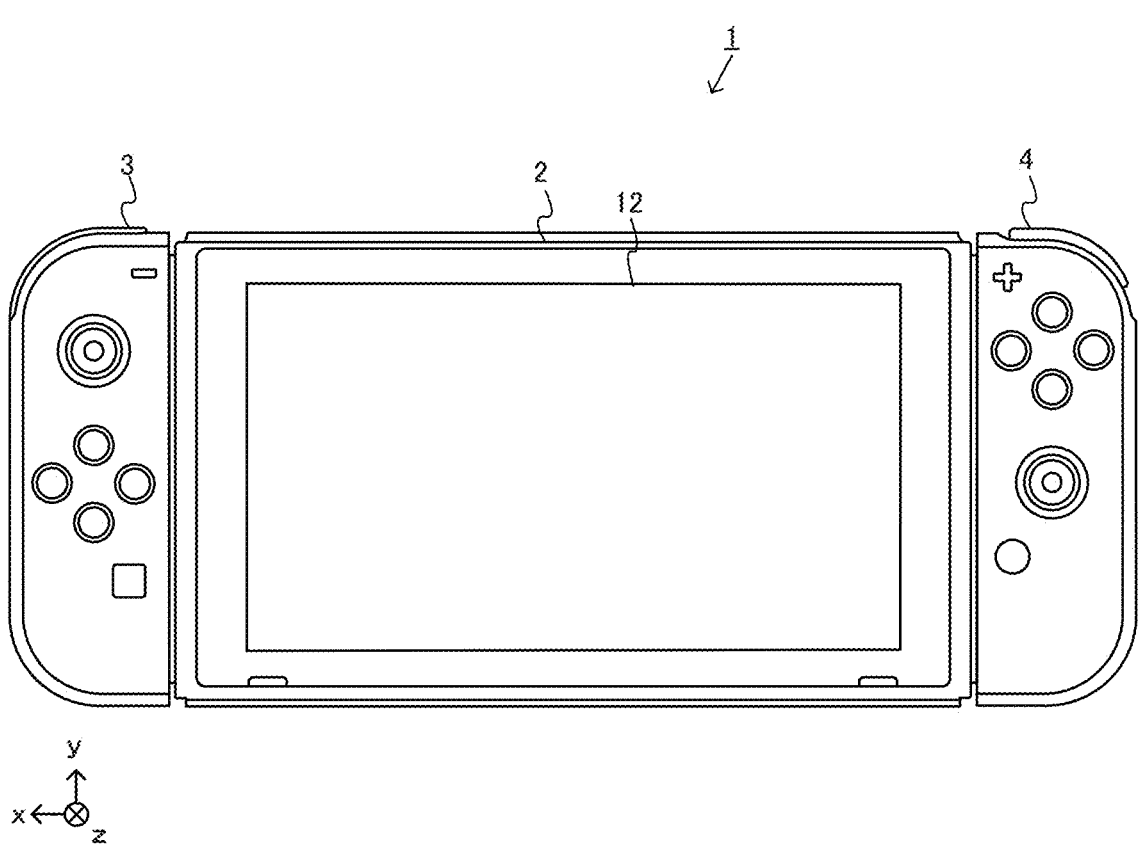

F I G. 2
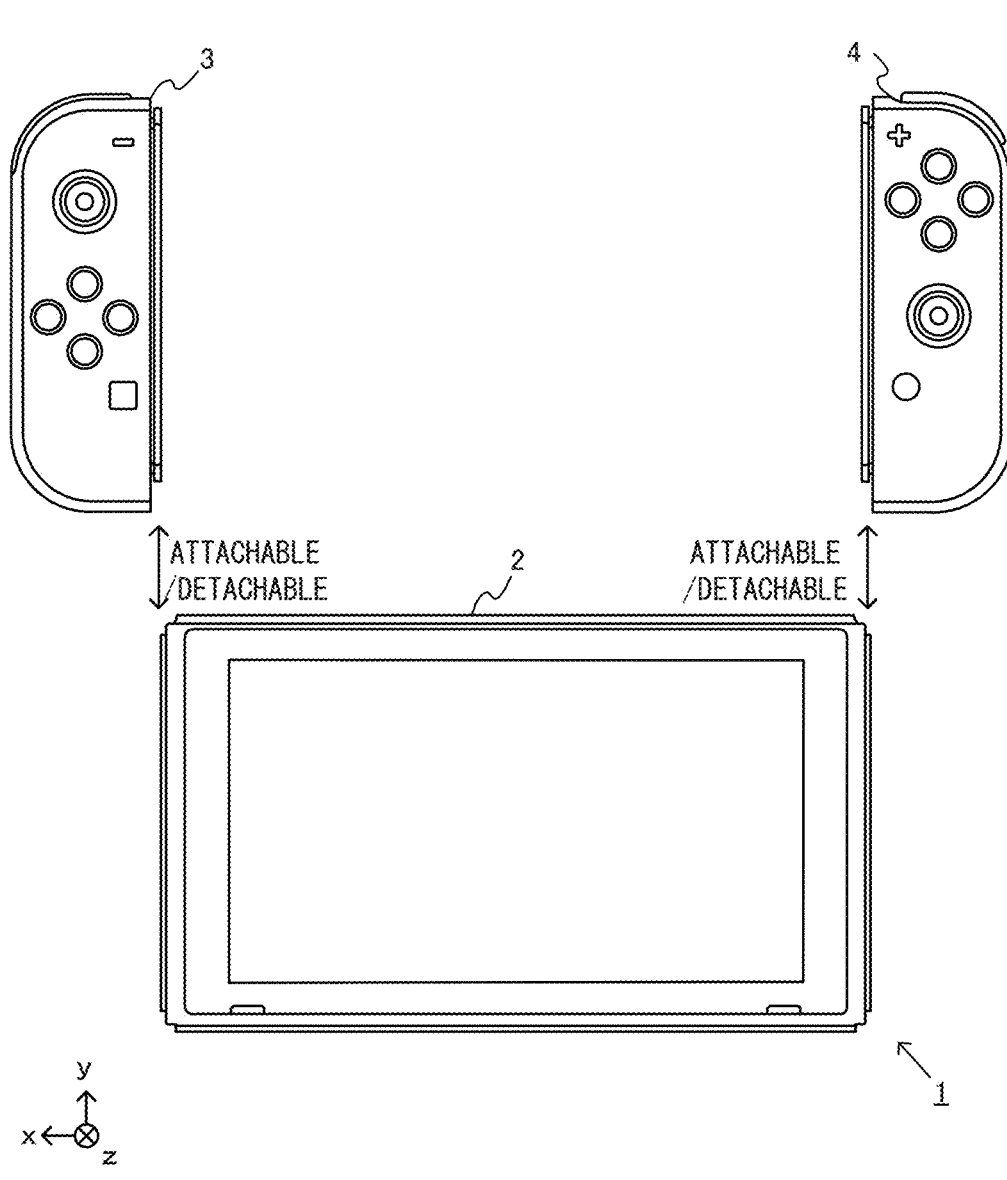

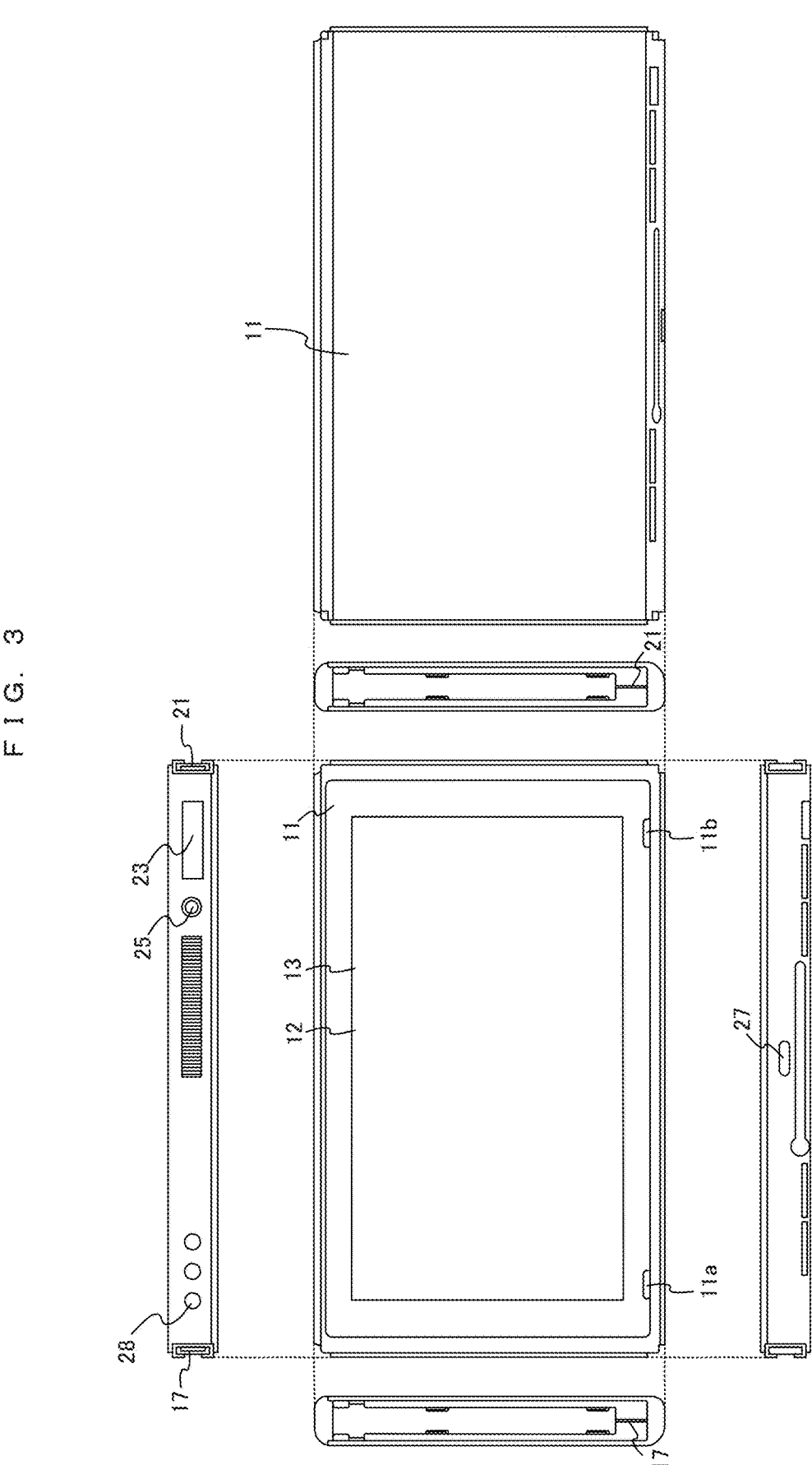
F I G. 3

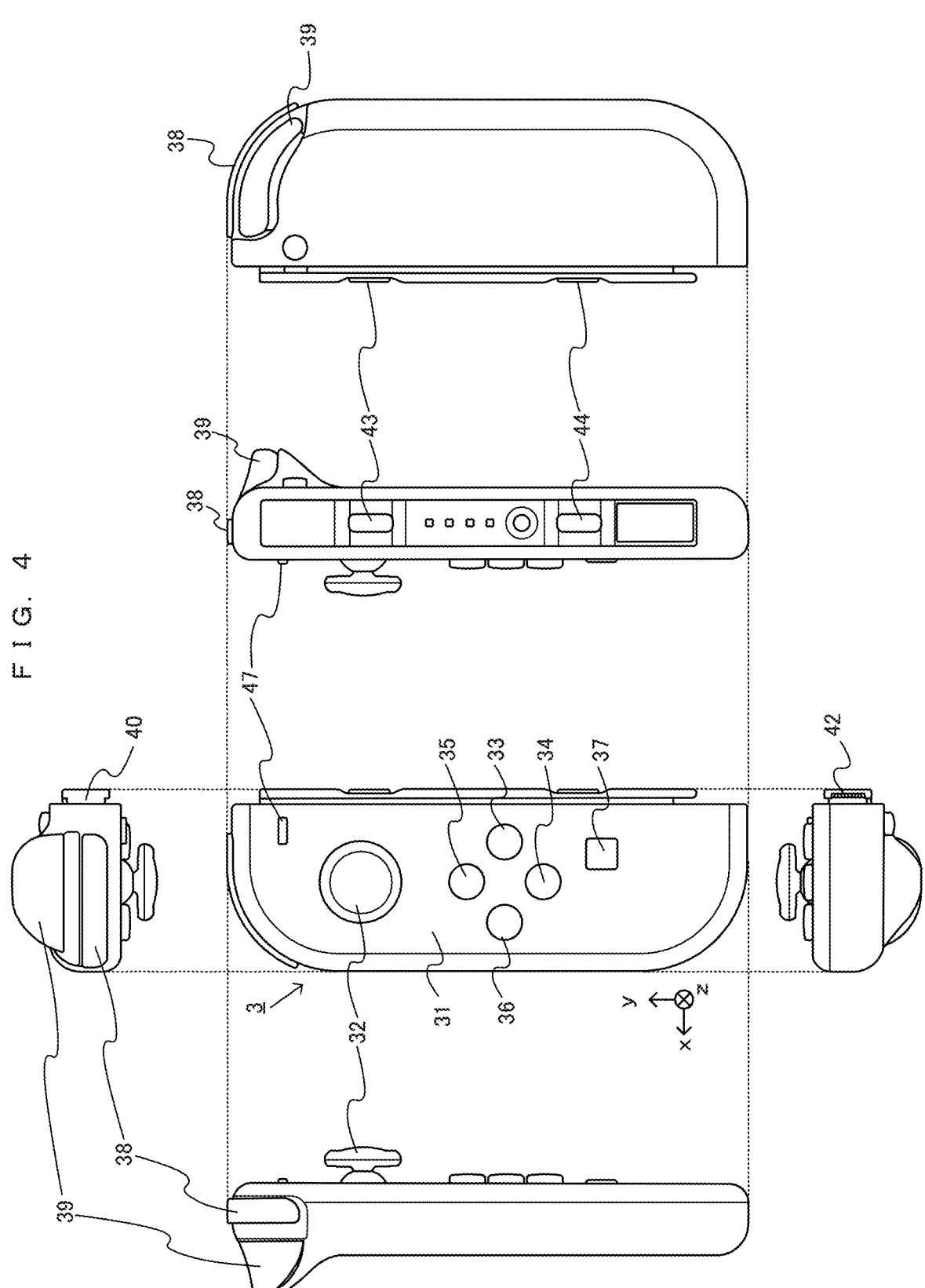
F I G. 4

F I G.  6
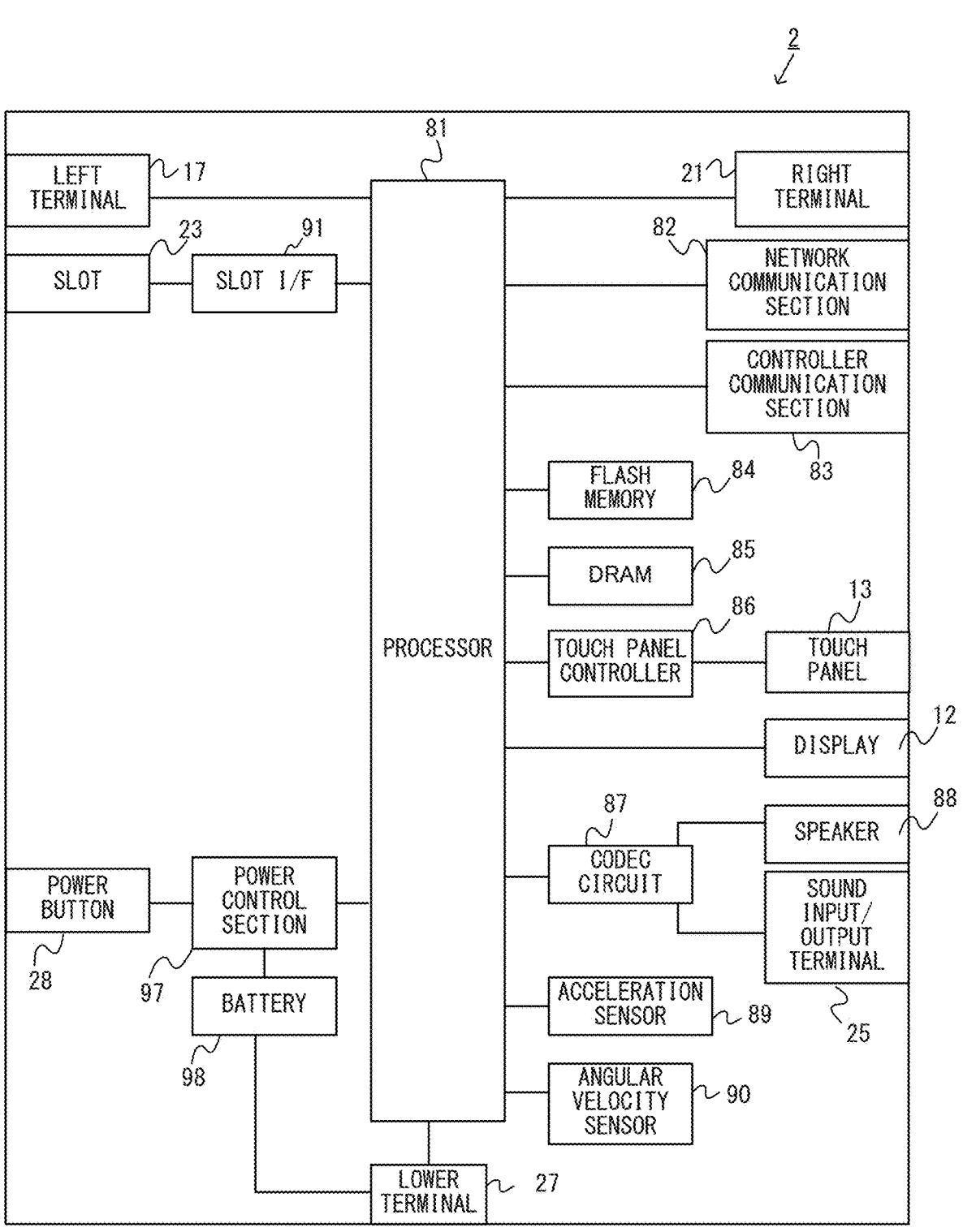

F I G. 7

F I G. 8
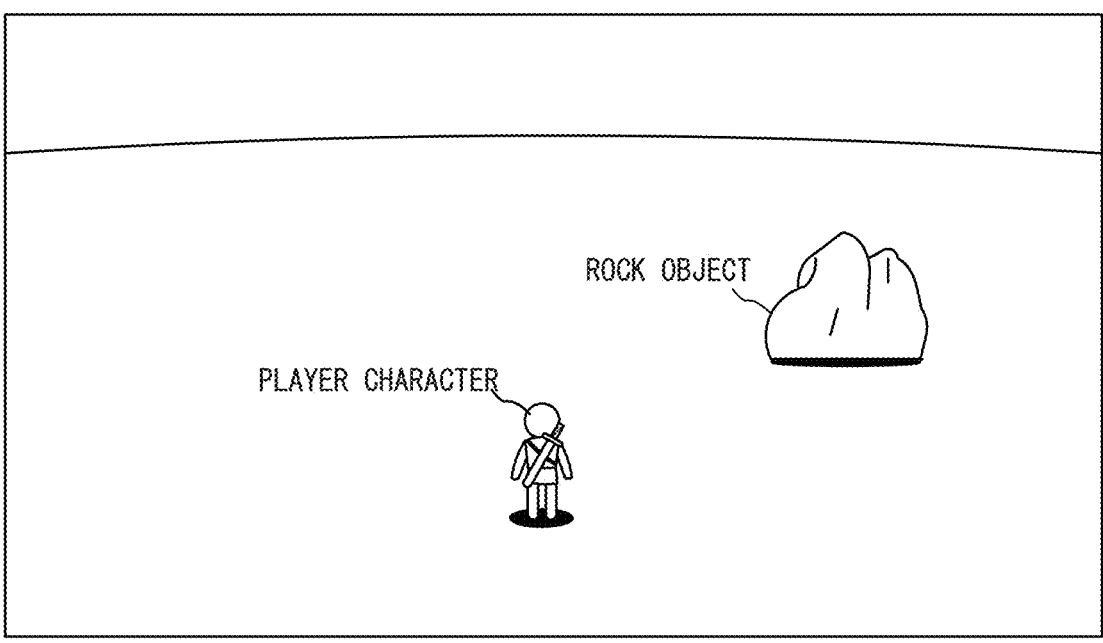
COORDINATE SYSTEM OF
VIRTUAL CAMERA

F I G. 9
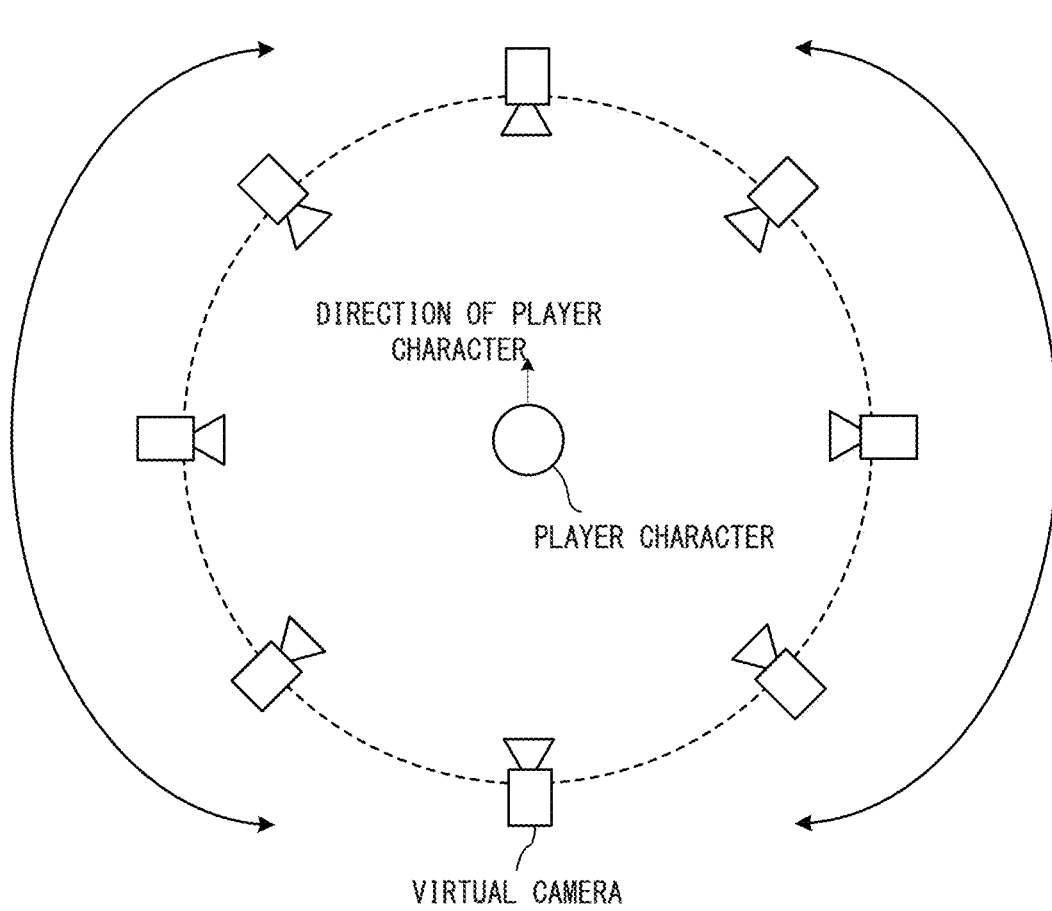

F I G.  1 0
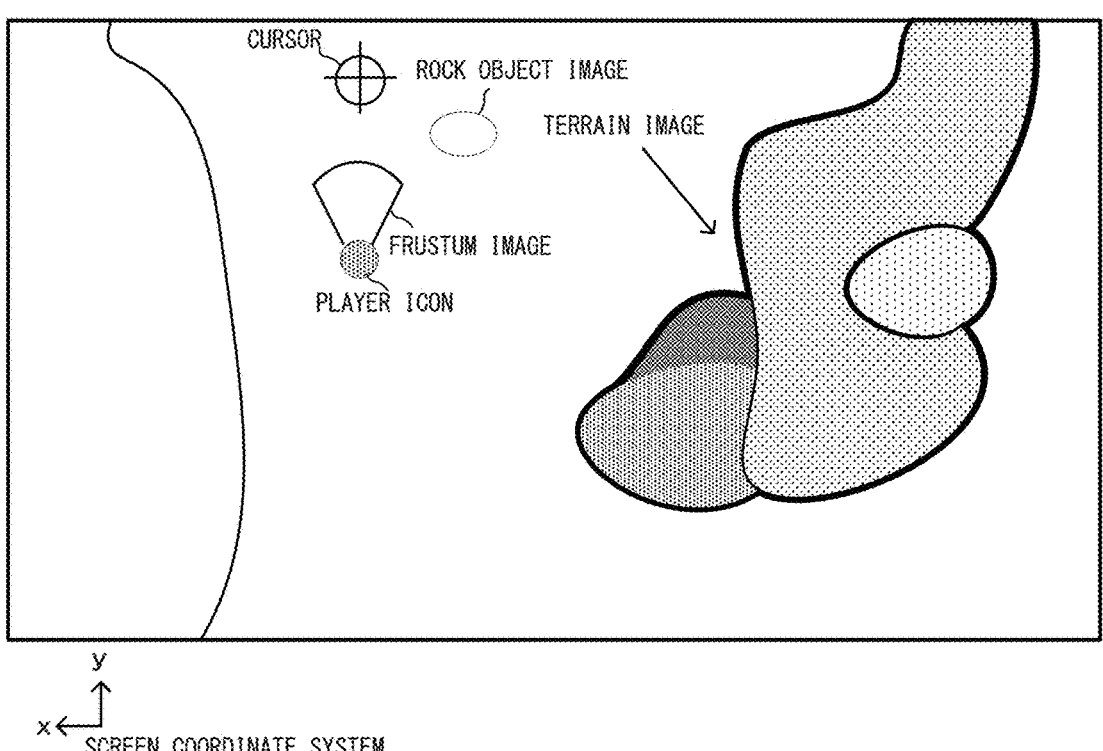
F I G.  1 1
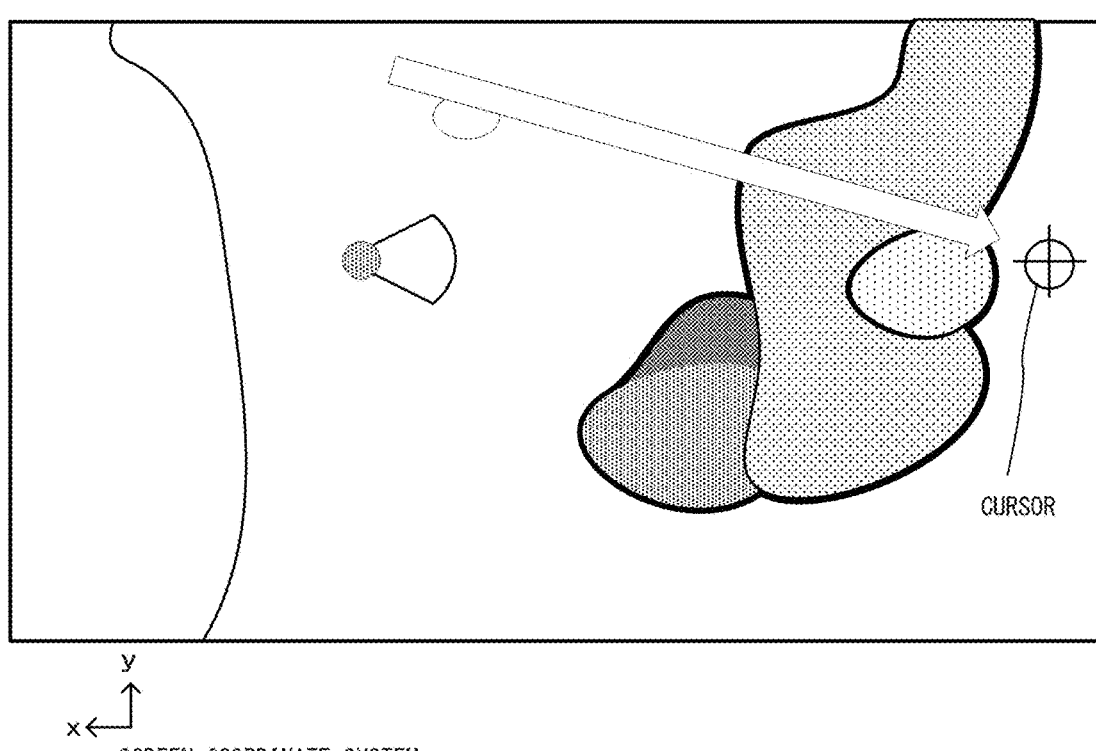

F I G .  1 2
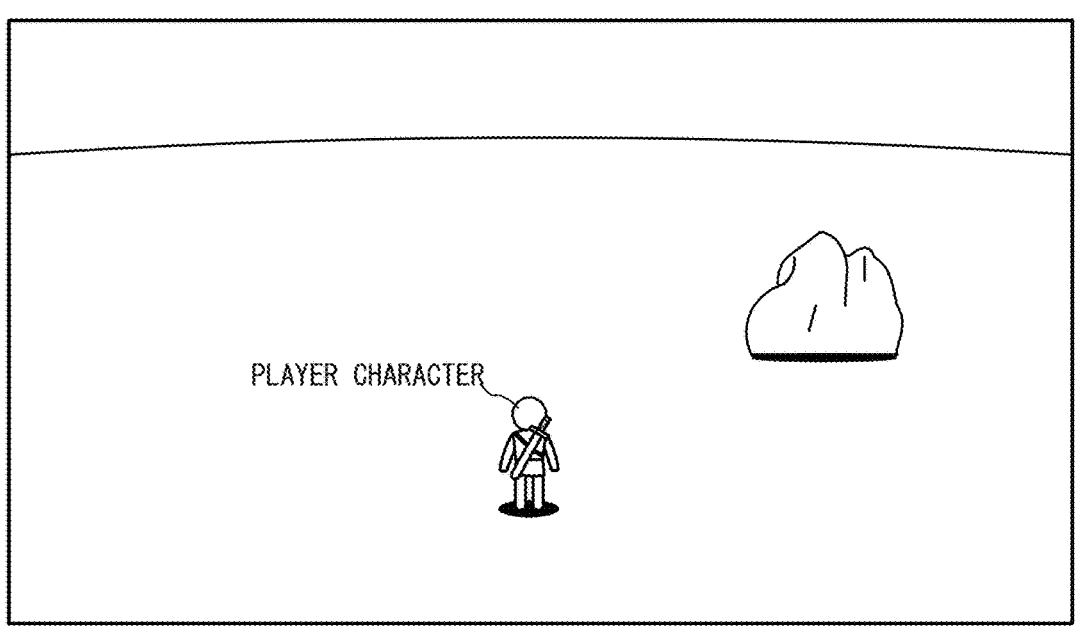
F I G .  1 3
DIRECTION OF
PLAYER CHARACTER
PLAYER CHARACTER
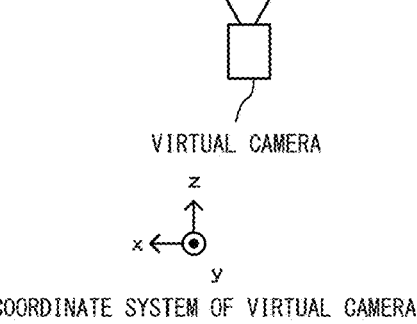
VIRTUAL CAMERA
COORDINATE SYSTEM OF VIRTUAL CAMERA F I G. 1 4
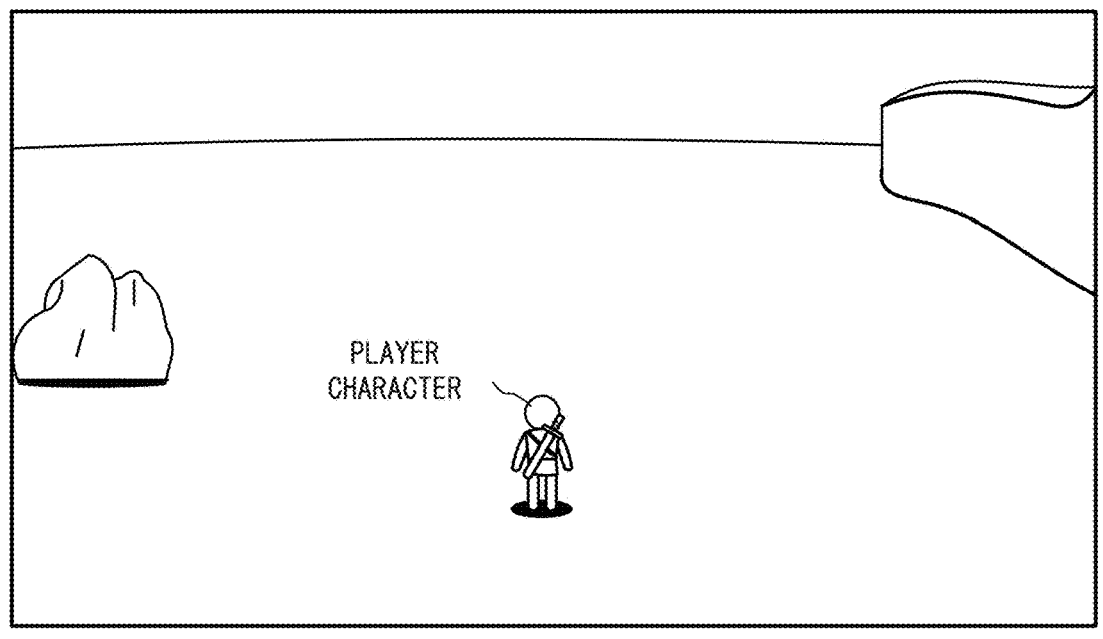
F I G. 1 5
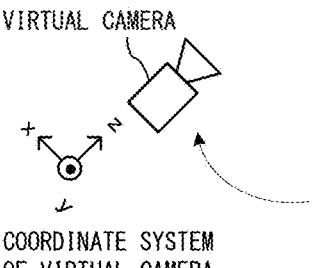

F I G. 1 8
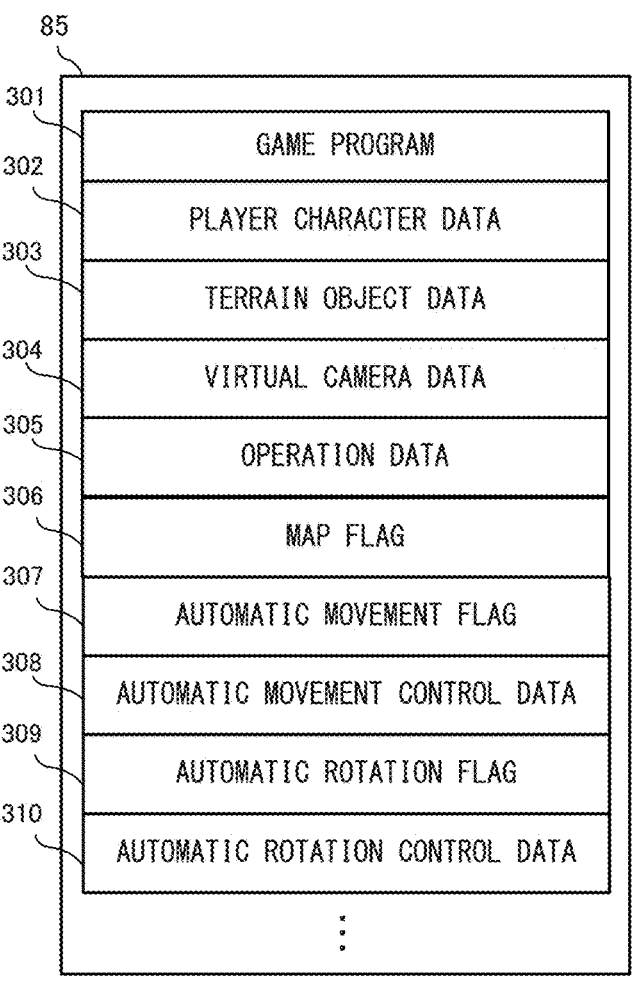
F I G. 1 9
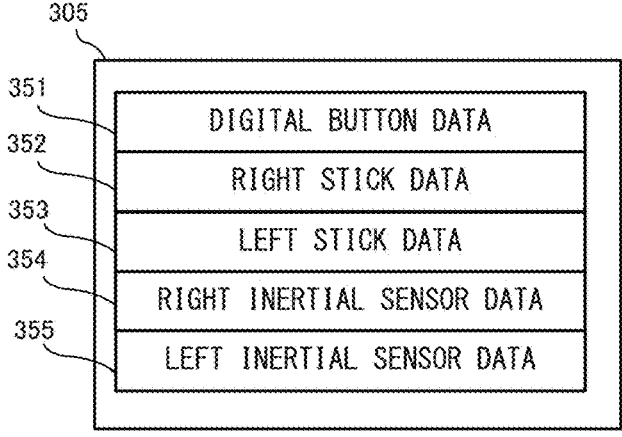

F I G.  2 0
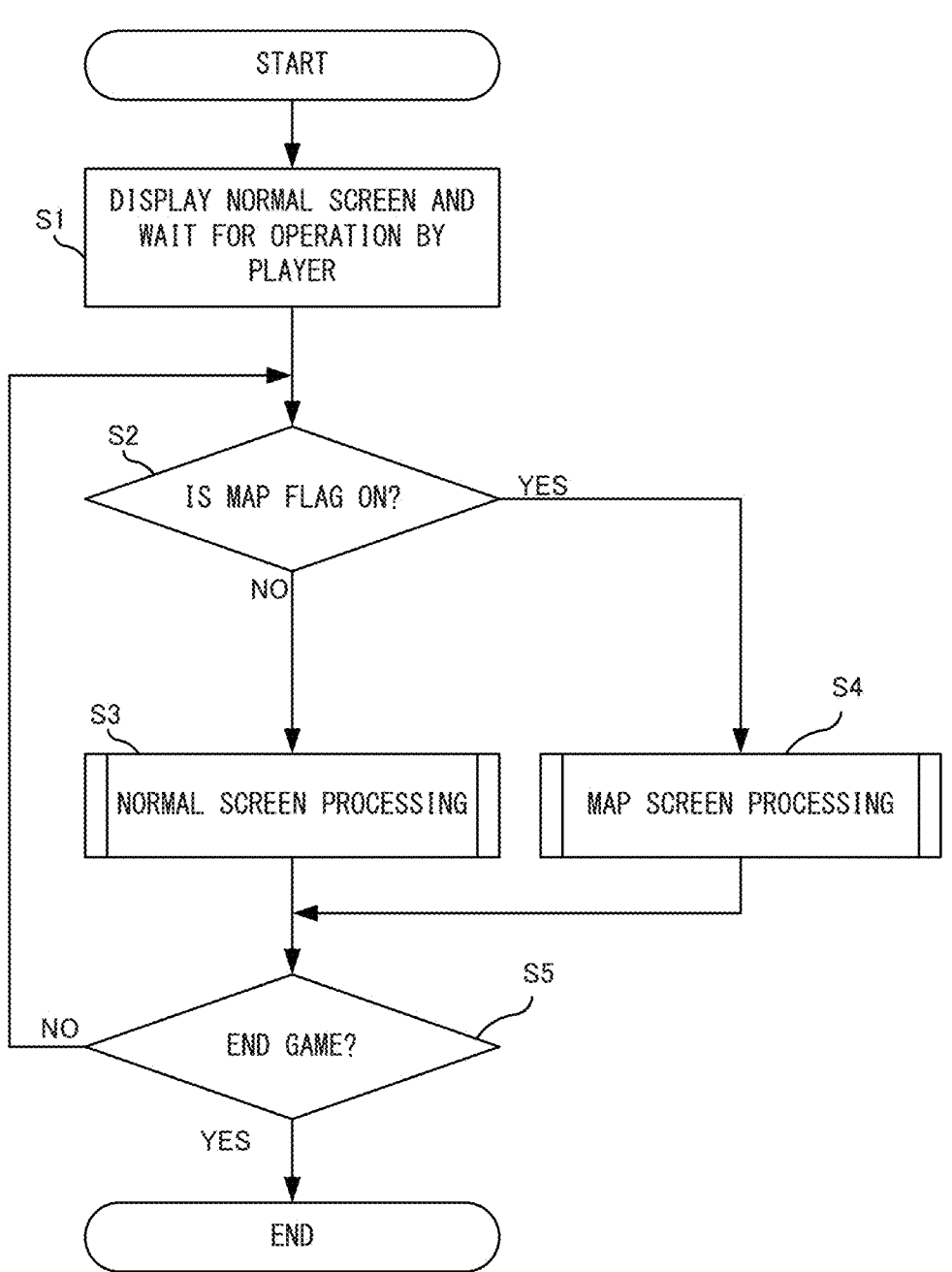

F I G. 2 2
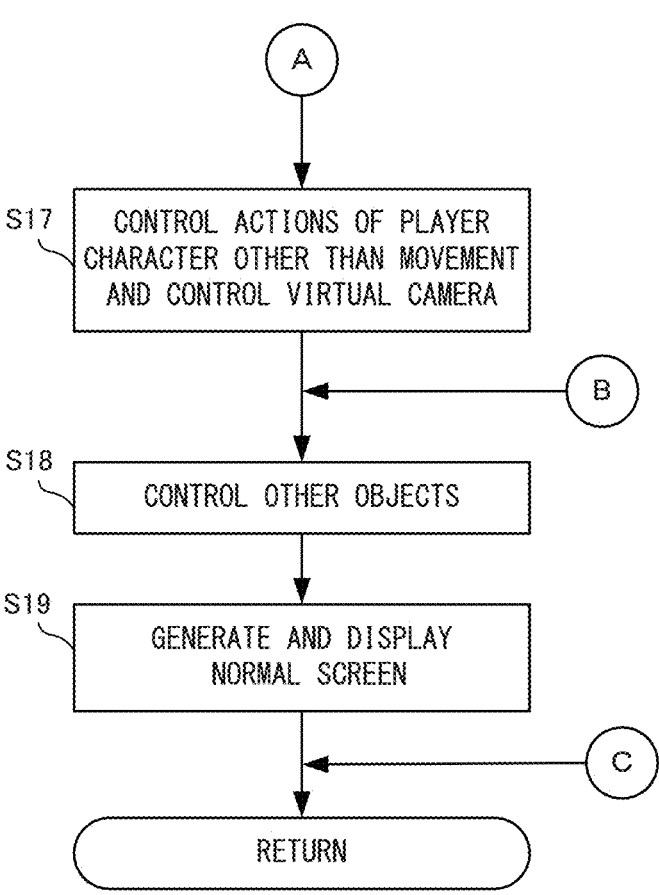

F I G. 2 4
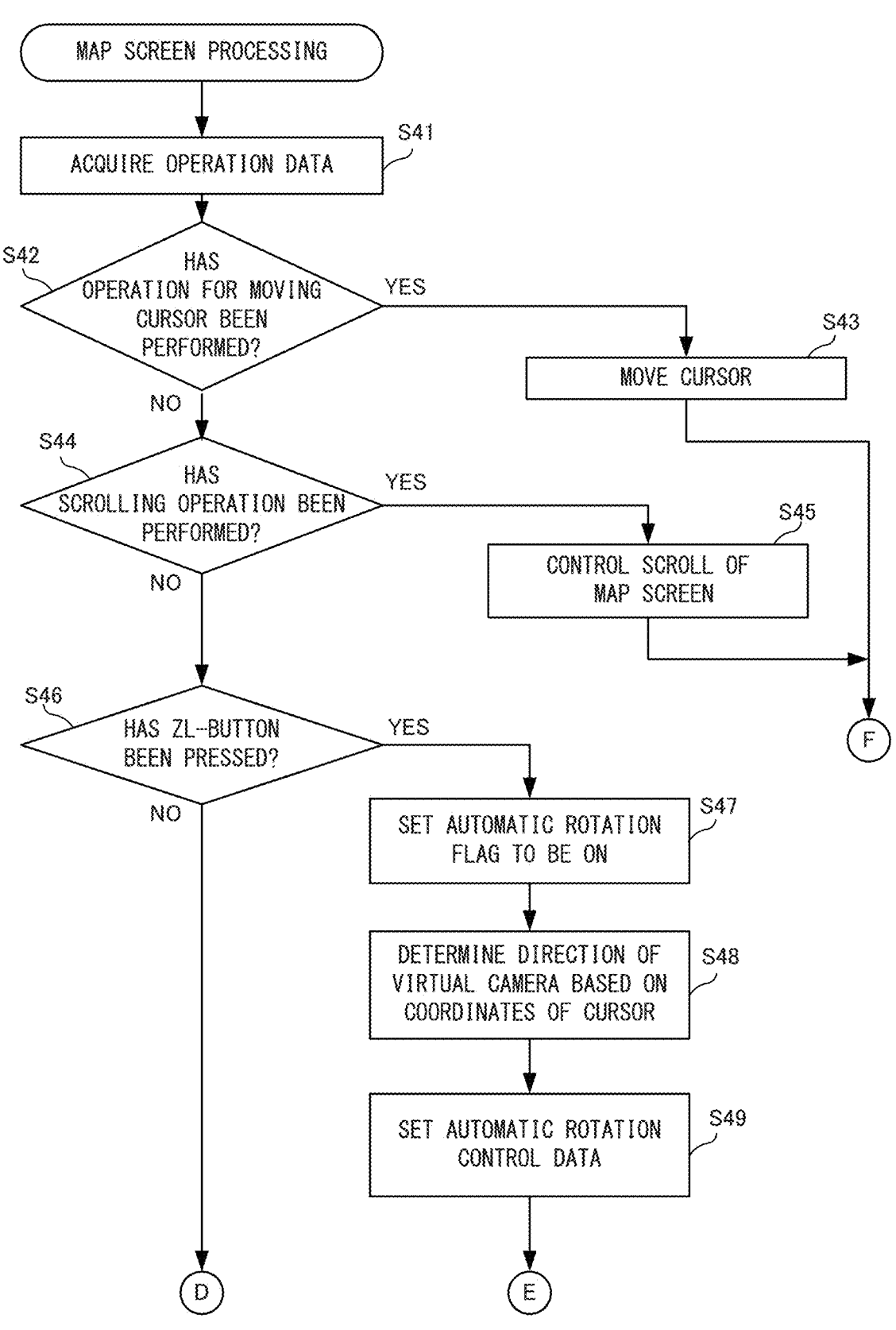

F I G.  2 5
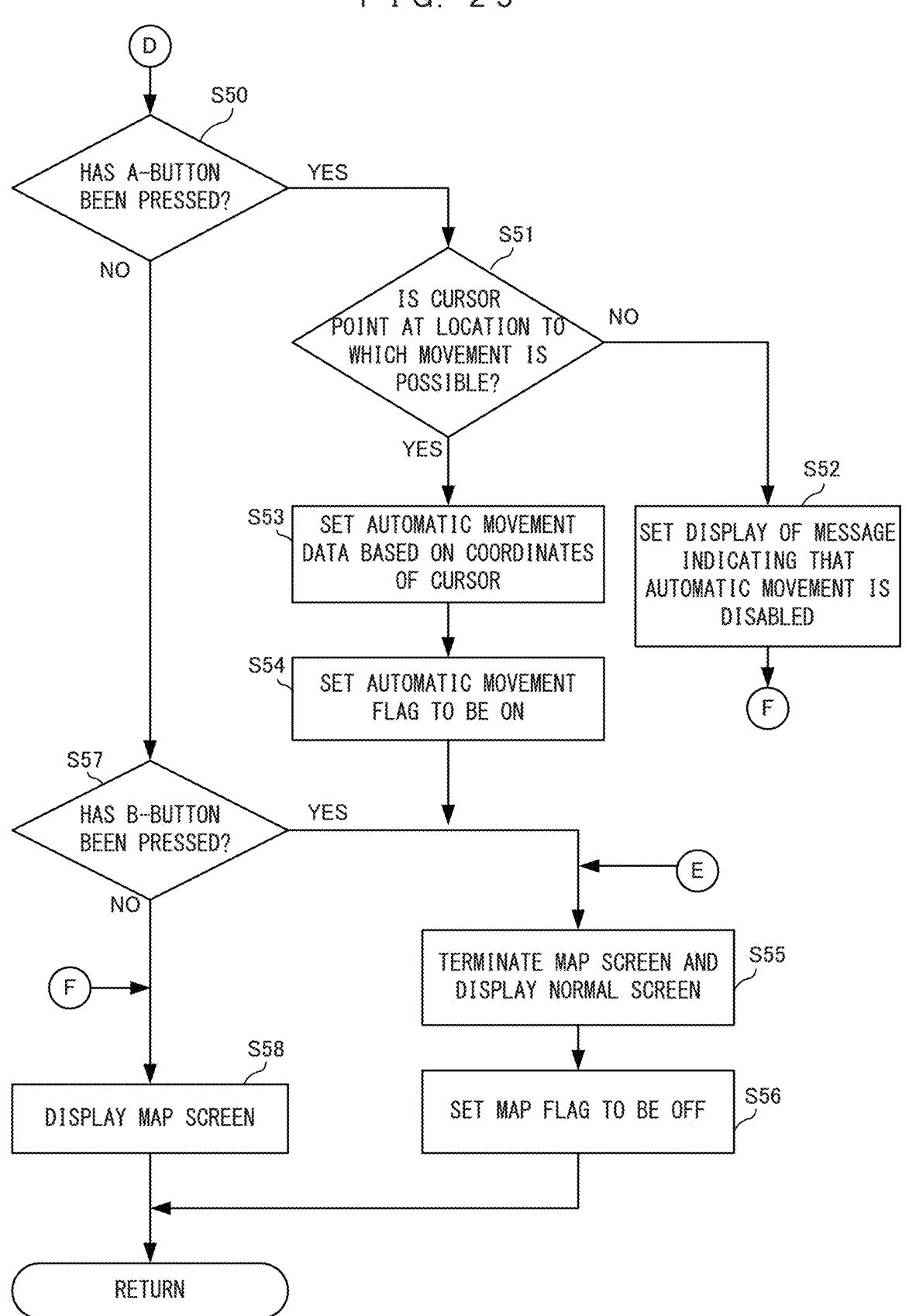

F I G. 2 6
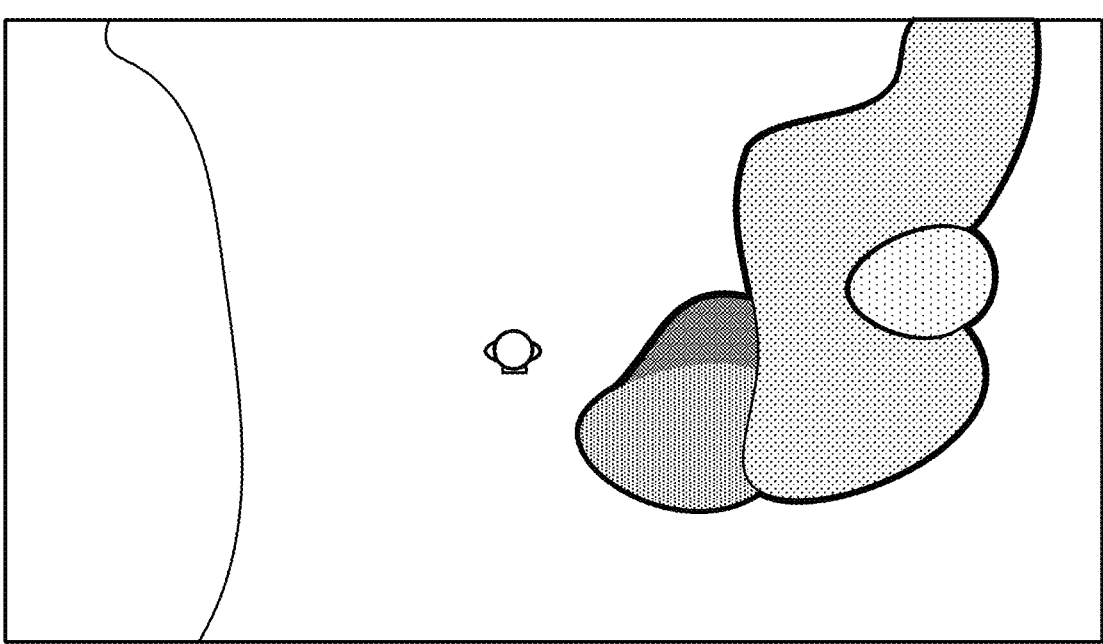
F I G. 2 7
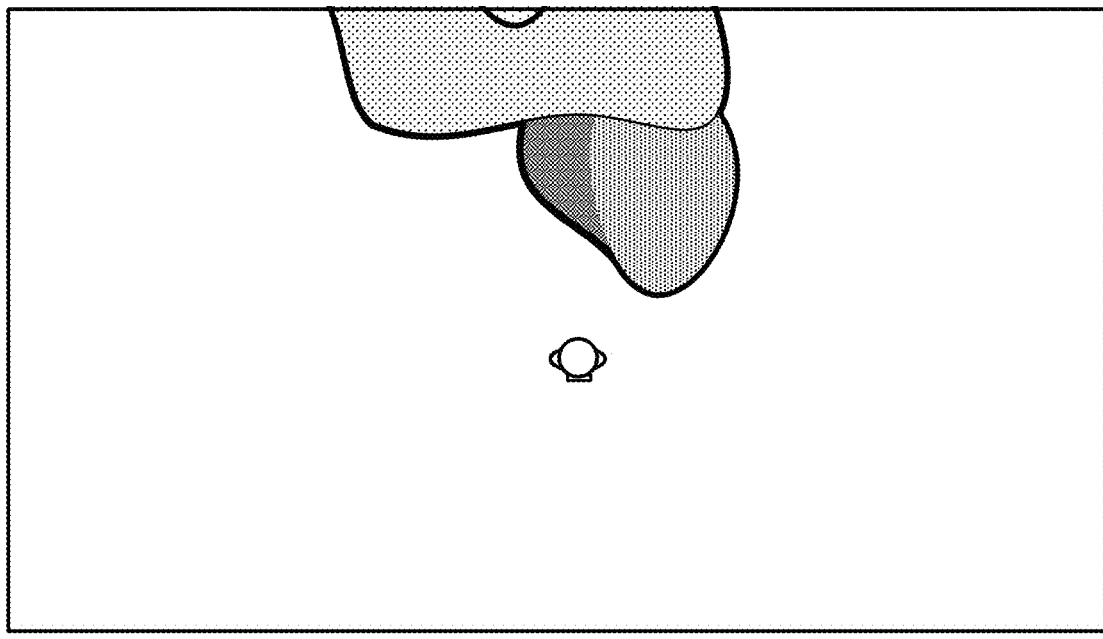

NON-TRANSITORY COMPUTER-READABLE STORAGE MEDIUM HAVING INFORMATION PROCESSING PROGRAM STORED THEREIN, INFORMATION PROCESSING SYSTEM, AND INFORMATION PROCESSING METHOD

CROSS REFERENCE TO RELATED APPLICATION

This application claims priority to Japanese Patent Application No. 2023-017466 filed on Feb. 8, 2023, the entire contents of which are incorporated herein by reference.

FIELD

The present disclosure relates to information processing in which a player object is moved in a virtual space on the basis of an operation performed by a user, an image of the virtual space is taken by a virtual camera, and the virtual space is rendered.

BACKGROUND AND SUMMARY

Hitherto, a game that progresses with a virtual three-dimensional space displayed on a first-person or third-person viewpoint, has been known. Also, a game that is such a game and for which a touch panel is used for operations, has been known. For example, a game that is played on a mobile terminal and in which the imaging direction of a virtual camera is adjustable by a touch operation, has also been known. In addition, a game that is such a game and in which a map image indicating the entirety or a part of a game world is displayed, has also been known. For example, a game in which a "mini-map" is displayed so as to be superimposed on the upper left or upper right of a 3D screen, has also been known.

In a game in which the imaging direction of a virtual camera is adjustable by an operation performed by a user, a user who has not gotten used to the game cannot have sufficient spatial perception for a virtual three-dimensional space, and when such a user tries to change the direction of the virtual camera by a touch operation, in some cases, it is not easy for the user to change the imaging direction to the desired direction, while grasping which direction a player character is facing in the virtual three-dimensional space. For example, it is conceivable to use a mini-map to present information on the field of view of the virtual camera, but it is still not easy to perform operations while viewing both the mini-map and the virtual three-dimensional space.

Therefore, the present application discloses a non-transitory computer-readable storage medium having an information processing program stored therein, an information processing system, and an information processing method that, when a user desires to change the imaging direction of a virtual camera on a screen on which a virtual space is displayed as a three-dimensional image, make it easier for the user to recognize how the imaging direction has been changed while enabling an accurate and easy imaging direction instruction operation.

For example, the following configuration examples are exemplified.

Configuration 1

Configuration 1 is directed to one or more non-transitory computer-readable storage media having stored therein an information processing program causing one or more processors to execute processing of moving a player object in a virtual space on the basis of an operation performed by a user, taking an image of the virtual space by a virtual camera, and rendering the virtual space, the information processing program causing the one or more processors to execute processing of:

performing first display obtained by taking an image of the virtual space by the virtual camera facing a first camera direction in the virtual space and rendering the virtual space;

during the first display, switching to second display representing the virtual space as viewed from above, according to an operation performed by the user, during the second display, designating a second camera direction on the basis of an operation performed by the user, the second camera direction being a direction on the second display;

during the second display, switching to the first display according to an operation performed by the user; and during a predetermined period after switching to the first display, changing a direction of the virtual camera from the first camera direction to a direction based on the second camera direction, taking an image of the virtual space, and rendering the virtual space.

According to the above configuration, in the display in which the virtual space is viewed from above, the direction desired to be faced in the virtual space can be designated, and the direction of the virtual camera is changed over a predetermined time after switching from the second display to the first display. Accordingly, it is made possible for the user to recognize how the direction of the virtual camera has been changed, so that the user's sense of direction is not impaired.

Configuration 2

In Configuration 2 based on Configuration 1 above, the second display may be display of a planar image representing terrain of the virtual space when the virtual space is viewed from above.

According to the above configuration, since the virtual space is displayed as a planar image, the terrain and the positional relationship in the virtual space can be presented in a form that is easy for the user to grasp. It is also possible to designate a direction to a point that is not visible in the first display, as the second camera direction.

Configuration 3

In Configuration 3 based on Configuration 1 above, the second camera direction may be determined by the user designating a point in the virtual space and performing a first operation during the second display.

According to the above configuration, for example, the player can designate, as the point, a point to which the player desires to move. The second camera direction can be determined on the basis of this point.

Configuration 4

In Configuration 4 based on Configuration 3 above, the second camera direction may be a direction from a position of the player object toward the point in the virtual space designated by the user.

According to the above configuration, the first display can be presented in a manner that makes it easy to understand which direction the point designated by the user is located from the position of the player character in the first display.

Configuration 5

In Configuration 5 based on Configuration 3 above, a second operation may be selectively accepted with the first operation during the second display, and if a point in the virtual space is designated and the second operation is performed, the player object may be moved to the designated point after switching from the second display to the first display.

According to the above configuration, by merely designating a point and performing the second operation during the second display, the player character can be automatically moved to the point after returning to the first display. Accordingly, the convenience of the player can be improved. In addition, during the second display, if the above first operation is performed, only the direction of the virtual camera can be changed. Therefore, the user can select control to be performed when returning from the second display to the first display, by selectively using the first operation and the second operation.

Configuration 6

In Configuration 6 based on Configuration 4 above, during the second display, if the point in the virtual space designated by the user is a point that cannot be reached by the player object, acceptance of the first operation may be restricted.

According to the above configuration, during the second display, if the user designates a point to which the player object cannot move, control in which the player object is automatically moved can be prevented from being selected. Accordingly, a wasteful action of the player object trying to move toward a location to which the player object cannot reach can be prevented from being performed when switching from the second display to the first display.

Configuration 7

In Configuration 7 based on Configuration 1 above, a part of the virtual space may be displayed in the second display, and a display range of the virtual space may be changed according to an operation performed by the user.

According to the above configuration, a direction to a point that is not visible in the first display can be designated.

Configuration 8

In Configuration 8 based on any one of Configurations 1 to 7 above, a direction image indicating an imaging direction of the virtual camera may be displayed in the second display, and a display position of the direction image may be changed such that a direction indicated by the direction image is changed according to an operation performed by the user.

According to the above configuration, during the second display, the direction of the virtual camera can be changed directly by an operation performed by the user, without designating a point.

Configuration 9

In Configuration 9 based on any one of Configurations 1 to 8 above, the player object may be set as a gazing point of the virtual camera in the first display, and the virtual camera may be rotated from the first camera direction to the direction based on the second camera direction such that only an angle of a yaw component thereof, which is a component corresponding to an imaging direction of the virtual camera, is changed and a pitch component and a roll component thereof are not changed.

Configuration 10

In Configuration 10 based on any one of Configurations 1 to 9 above, the first camera direction may be a predetermined direction that is not a vertically downward direction in the virtual space.

According to the above configuration, a three-dimensional image having a sense of perspective and a sense of depth is represented as the first display to the user. Then, the direction of the virtual camera is changed over a predetermined period of time when switching from the second display to the first display, thereby allowing the user to grasp the change in direction without impairing the user's sense of direction in the virtual three-dimensional space.

According to the present disclosure, a predetermined direction can be designated by using the second display showing the virtual space as viewed from above, and the direction of the virtual camera is changed over a predetermined period of time when switching to the first display, thereby making it easier for the user to grasp the change in the direction of the virtual camera.

BRIEF DESCRIPTION OF THE DRAWINGS

FIG. 1 shows a non-limiting example of a state where a left controller 3 and a right controller 4 are attached to a main body apparatus 2;

FIG. 2 shows a non-limiting example of a state where the left controller 3 and the right controller 4 are detached from the main body apparatus 2;

FIG. 3 is six orthogonal views showing a non-limiting example of the main body apparatus 2;

FIG. 4 is six orthogonal views showing a non-limiting example of the left controller 3;

FIG. 6 is a block diagram showing a non-limiting example of the internal configuration of the main body apparatus 2;

FIG. 7 is a block diagram showing non-limiting examples of the internal configurations of the main body apparatus 2, the left controller 3, and the right controller 4;

FIG. 8 shows a non-limiting example of a normal screen according to an exemplary embodiment;

FIG. 9 illustrates movement of a virtual camera;

FIG. 10 shows a non-limiting example of a map screen according to the exemplary embodiment;

FIG. 11 shows a non-limiting example of the map screen according to the exemplary embodiment;

FIG. 12 shows a non-limiting example of the normal screen according to the exemplary embodiment;

FIG. 13 illustrates an outline of processing according to the exemplary embodiment;

FIG. 14 shows a non-limiting example of the normal screen according to the exemplary embodiment;

FIG. 15 illustrates the outline of the processing according to the exemplary embodiment;

FIG. 18 illustrates a memory map showing a non-limiting example of various kinds of data stored in a DRAM 85;

FIG. 19 shows a non-limiting example of operation data 305;

FIG. 20 is a non-limiting example flowchart showing the details of game processing according to the exemplary embodiment;

FIG. 22 is a non-limiting example flowchart showing the details of the normal screen processing;

FIG. 24 is a non-limiting example flowchart showing the details of map screen processing;

FIG. 25 is a non-limiting example flowchart showing the details of the map screen processing;

FIG. 26 shows a non-limiting example of a normal screen in a modification; and FIG. 27 shows a non-limiting example of the normal screen in the modification.

DETAILED DESCRIPTION OF NON-LIMITING EXAMPLE EMBODIMENTS

Figure 5:
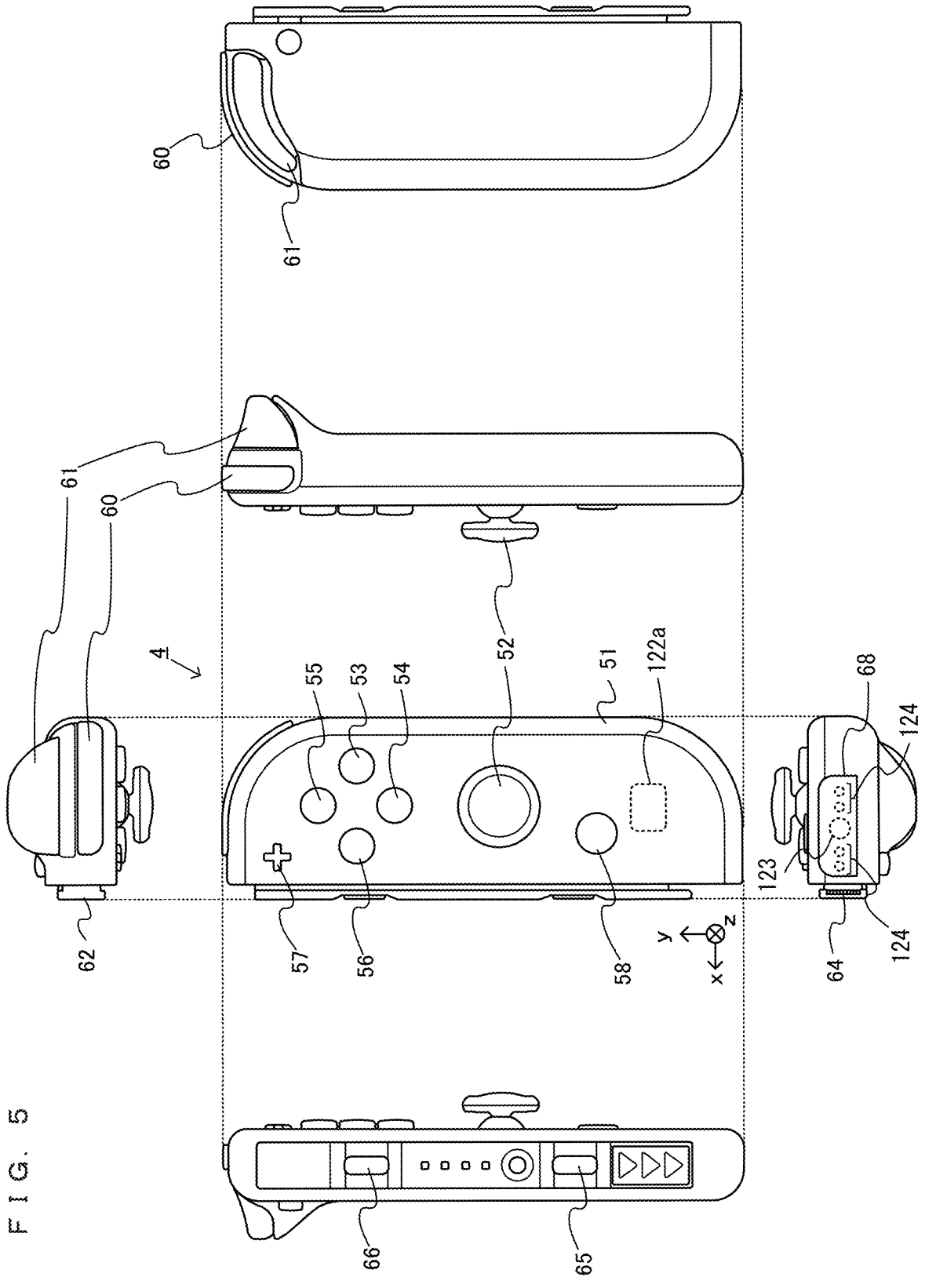
FIG. 5 is six orthogonal views showing a non-limiting example of the right controller 4.

Hereinafter, one exemplary embodiment will be described.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed in the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3.

Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various kinds of data (or programs) to be saved in the main body apparatus 2. The DRAM 85 is a memory used to temporarily store various kinds of data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
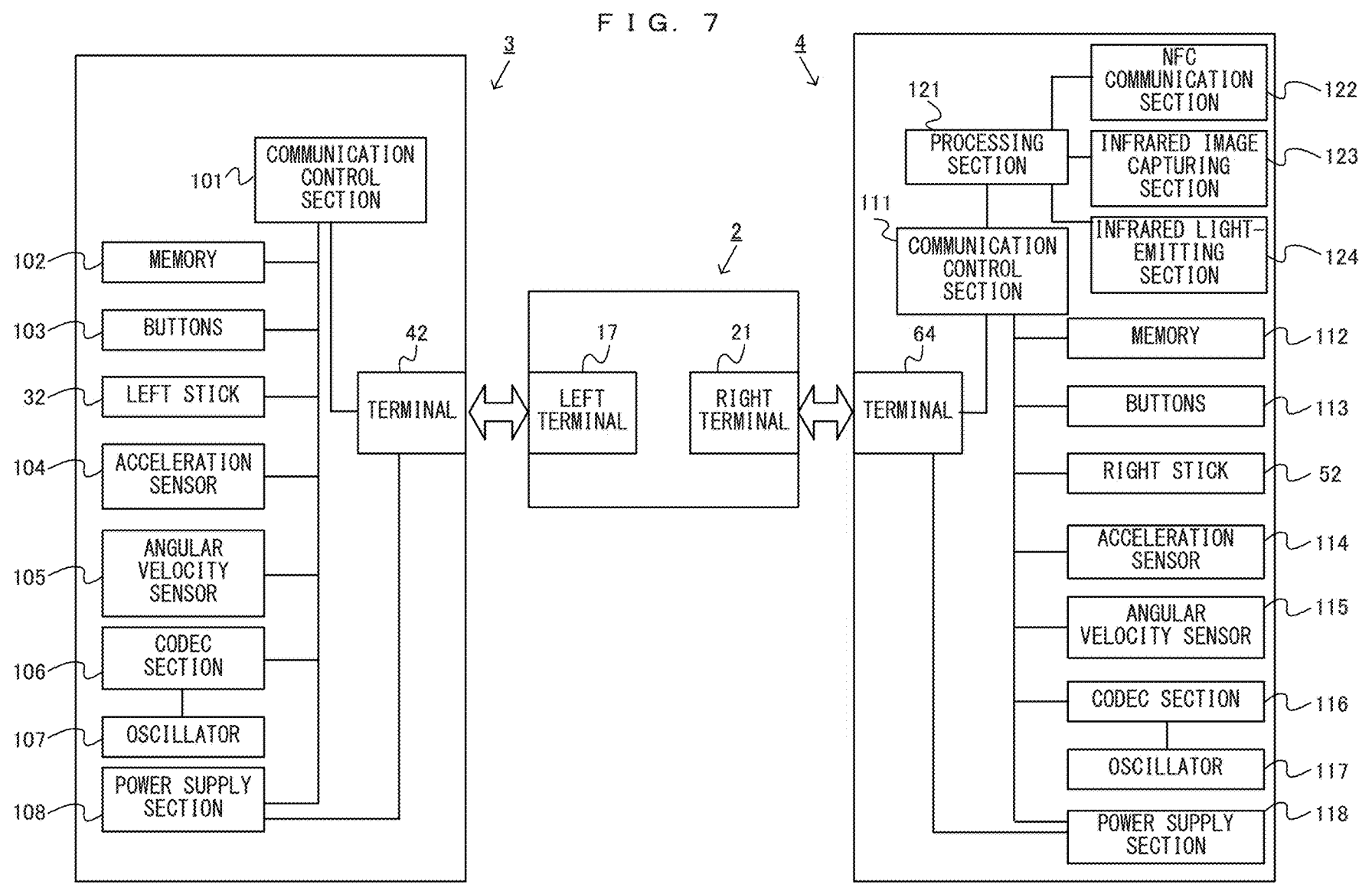

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Outline of Information Processing in Exemplary Embodiment

Next, an outline of operation of the information processing executed by the game system 1 according to the exemplary embodiment will be described. In the exemplary embodiment, as an example of the information processing, a description will be given assuming processing of a game that is played by a user operating a player character object (hereinafter referred to as player character) that exists in a virtual three-dimensional space (hereinafter referred to simply as virtual space). More specifically, the processing according to the exemplary embodiment is mainly related to control of a virtual camera in the virtual space.

FIG. 8 shows an example of a game screen of the game according to the exemplary embodiment. In the example in FIG. 8, a part of the virtual space is displayed as a three-dimensional image. In FIG. 8, the player character and a rock object are also displayed. As shown in FIG. 8, in the exemplary embodiment, the game screen is rendered on a third-person viewpoint. Specifically, the player character is set as the gazing point of the virtual camera. In addition, the virtual camera is positioned at a distance from the player character such that the entire player character can be seen. The initial position of the virtual camera is behind the player character. In addition, the height at which the virtual camera is located is close to the ground to some extent, and the direction of the virtual camera is substantially horizontal to the ground. Therefore, the game screen is basically a game screen on which a situation in the forward direction of the player character (depth direction) is displayed while the entire body of the player character on the back side is displayed. In addition, if the player character moves, the virtual camera, in principle, moves so as to follow the player character from behind while maintaining a certain distance thereto. Therefore, if the direction of the player character is changed due to the movement of the player character, the virtual camera moves around behind the player character.

If the player character is not moved and only the imaging direction of the virtual camera (hereinafter referred to as direction of the virtual camera) is changed, the virtual camera moves around the player character while changing the direction of the virtual camera. FIG. 9 shows an example of the movement of the virtual camera in this case. As shown in FIG. 9, the virtual camera moves along a circumference centered on the player character, which is the gazing point, while maintaining a certain distance from the player character and changing the direction of the virtual camera such that the virtual camera always faces the player character. That is, if the direction of the virtual camera changes, the position of the virtual camera also changes.

In the exemplary embodiment, the default position of the virtual camera is a position behind the player character, but in some cases, the virtual camera may be moved so as to follow the player character while being located at a position that is not behind the player character. For example, while the direction of the virtual camera is maintained as a direction to the right side of the player character, the virtual camera may be moved as the player character moves. In this case, the situation may be a situation in which, in a state where the left side of the player character is shown, the virtual camera is moving in parallel with the player character.

In the game according to the exemplary embodiment, in the game screen shown in FIG. 8 above, the player character can be moved to various locations in the virtual space on the basis of operations performed by the user. Here, the virtual space of the game is assumed to be a vast space. In this regard, it is difficult to grasp the whole picture of the virtual space only from the amount of information obtained from the game screen on which a part of the virtual space is displayed as a three-dimensional image as shown in FIG. 8. Therefore, in the game, in addition to the game screen shown in FIG. 8, a screen called "map screen" which shows the virtual space as viewed from above can be displayed, for example, for the purpose of making it easier for the user to grasp the overall geography and terrain of the virtual space. In the following description, the game screen as shown in FIG. 8 is referred to as "normal screen".

Next, the above map screen will be described. FIG. 10 shows an example of the map screen. In FIG. 10, a map image is shown in a full screen format. The map image is a planar image that represents the terrain of the virtual space when the virtual space is viewed from directly above. In addition, in the example in FIG. 10, the entire virtual space is not displayed in the display range of the screen, but only a part of the virtual space is shown, and the screen can be scrolled. In FIG. 10, a player icon indicating the player character, and a cursor are also displayed. In addition, a substantially fan-shaped frustum image is displayed adjacent to the player character. In the example in FIG. 10, an image corresponding to the above rock object is displayed on substantially the upper right side of the player icon. Furthermore, a terrain image corresponding to a terrain object that represents a rocky mountain as a motif is displayed on the right side in the screen. In this example, the terrain object is an object having a ground surface at a position higher to some extent than the ground where player character is located.

The map image used on the map screen may be an image obtained by taking an image of the virtual space by the virtual camera from above, or may be an image obtained by taking an image of the virtual space from above through perspective projection. In addition, an abstracted image of the virtual space as viewed from above (e.g., an illustrated image) separately prepared for the map screen may be used. In the exemplary embodiment, the abstracted image of the virtual space as viewed from above separately prepared for the map screen is used.

Next, operations that can be performed by the user in the map screen will be described. First, in the exemplary embodiment, the user can move the cursor on the map image by operating the left stick 32 in the above map screen. For example, in FIG. 10, the cursor is displayed near the upper left edge of the screen. If the left stick 32 is tilted to the lower right from this state, the cursor can be moved in the lower right direction as shown in FIG. 11. Here, in the exemplary embodiment, the display position of the frustum image also changes as the cursor moves. Specifically, as shown in FIG. 11 mentioned above, the display position changes such that a distal end portion of the frustum image faces a direction to the cursor. That is, the direction of the distal end portion of the frustum image is also controlled so as to change in conjunction with the movement of the cursor, so that it is made easier to understand which direction the virtual camera faces. In the exemplary embodiment, the frustum image is rotated in conjunction with the movement of the cursor, but in another exemplary embodiment, the frustum image may not necessarily be rotated. By not rotating the frustum image on the map screen, the user can be made aware that the virtual camera has not yet rotated at that time.

By performing a predetermined operation, the user can end the display of the map screen and switch the screen to the normal screen. In the exemplary embodiment, as the operation for ending the display of the map screen, multiple operation methods can be used. Specifically, switching from the map screen to the normal screen can be performed by an operation of pressing the A-button 53 (hereinafter referred to as automatic movement instruction operation), an operation of pressing the ZL-button 39 (hereinafter referred to as automatic rotation instruction operation), or an operation of pressing the B-button 54 (hereinafter referred to as simple end operation). Hereinafter, each of these operations will be described.

Automatic Movement Instruction Operation

First, the automatic movement instruction operation using the A-button 53 will be described. If the user presses the A-button 53 in the map screen, the screen is switched from the map screen to the normal screen, and "automatic movement control" can be started. The automatic movement control is control in which, after switching from the map screen to the normal screen, the player character is automatically moved toward a point (hereinafter referred to as cursor point), in the virtual space, corresponding to the position of the cursor on the map screen. More specifically, if the A-button 53 is pressed, a path from the current position of the player character in the virtual space to the cursor point when the A-button 53 is pressed is calculated. This path is calculated as a shortest path reaching the cursor point while avoiding obstacles. For example, using the positional relationship shown in FIG. 11 above as an example, a path along which the player character does not move straight to the cursor point from the current position, but moves around the terrain object to reach the cursor point without coming into contact with the terrain object, is calculated. Then, the player character automatically moves along this path. That is, by moving the cursor to the desired point on the map screen and pressing the A-button 53, the user can switch the screen from the map screen to the normal screen and automatically move the player character toward the cursor point. In other words, the user can designate a destination on the map screen where the overall terrain of the virtual space is easily grasped, and automatically move the player character. Accordingly, the convenience of the user can be improved. In this example, during the automatic movement control, an operation for moving the player character by the user is accepted until the user performs a predetermined "automatic movement cancellation operation". In addition, during the automatic movement control, the virtual camera is controlled to move so as to follow the player character from behind.

In the virtual space, there are various terrains and differences in height therebetween, etc., so that the cursor may be at a point, on the map screen, that cannot be reached by the player character in the virtual space. If the A-button 53 is pressed in a state where the cursor is indicating such a reach point, a message indicating that the automatic movement control cannot be performed is displayed, and control in which the map screen is not terminated is performed.

Automatic Rotation Instruction Operation

Next, the action made if the automatic rotation instruction operation is performed by pressing the ZL-button 39 in the map screen will be described. In the exemplary embodiment, if the automatic rotation instruction operation is performed, after returning to the normal screen, control in which the direction of the virtual camera is changed over a predetermined time (e.g., 1 to 2 seconds) such that the virtual camera faces the cursor point (hereinafter referred to as automatic rotation control) is performed. That is, after switching to the normal screen, the above automatic movement control is not performed, but control in which only the direction of the virtual camera is turned toward the cursor point is performed. In other words, the user is informed of which direction the cursor point is located in, and whether or not to move is left to the user's subsequent decision.

Also, supplementary description will be given regarding the above change of the direction of the virtual camera. In the exemplary embodiment, where the direction of the virtual camera is taken as three axis components with the vertical direction of the virtual space as a y-axis, the depth direction (imaging direction) as a z-axis, and an axis orthogonal to these two axes as an x-axis, the direction of the virtual camera is changed by only rotating the virtual camera around the y-axis. In other words, the yaw component (z-axis component) of the virtual camera is changed to an angle at which the virtual camera faces the direction to the cursor point, and the pitch component and the roll component of the virtual camera are not changed. In addition, since the gazing point is the player character as described above, the position of the virtual camera changes with the change of the direction of the virtual camera (see FIG. 9 above).

Here, in the exemplary embodiment, if the map screen is terminated by the above automatic rotation instruction operation and the screen is switched to the normal screen, control in which the virtual camera is not instantly turned toward the direction to the cursor point but is turned toward the direction to the cursor point over a certain time as described above, is performed. This is for the following reason. It is assumed that the virtual camera is already facing the cursor point when the map screen is terminated and the screen is switched to the normal screen. In this case, it may be difficult for the user to recognize from which direction and to which direction the direction of the virtual camera is changed before and after the map screen is displayed. In addition, it may also be difficult for the user to know which direction the virtual camera is before the map screen is displayed. Therefore, in some cases, this may impair the user's sense of direction in the normal screen on which the virtual space is displayed as a three-dimensional image, leading to a situation where the user gets lost in the virtual space. In particular, unlike a location where a landmark that can serve as a guide can be seen in the virtual space, at a location where there is no object serving as such a landmark and which is surrounded by similar scenery, it may be difficult for the user to grasp the sense of direction in the normal screen. Therefore, in the exemplary embodiment, when the screen is switched from the map screen to the normal screen, the direction and the position of the virtual camera are controlled to be changed over a short time from the direction in which the virtual camera faces before shifting to the map screen to the direction to the cursor point. Accordingly, when the screen is switched from the map screen to the normal screen, the user can be informed of the direction to the cursor point such that the user's sense of direction is not impaired.

In the exemplary embodiment, when the screen is switched from the map screen to the normal screen by the above automatic rotation instruction operation, the direction of the player character is controlled such that the player character faces the cursor point. By also changing the direction of the player character as described above, the change in direction can be more clearly conveyed. In addition, an operation for changing the direction of the player character by the user themselves can be omitted, so that the convenience of the user can be improved. However, in another exemplary embodiment, when the screen is switched to the normal screen by the automatic rotation instruction operation, the direction of the player character may not necessarily be changed. In this case, for example, the screen can change from a screen on which the back of the player character is shown before entering the map screen, to a screen on which the side or front of the player character is shown. This case is advantageous in that it is easier to inform the user of the difference in direction before and after the map screen is displayed. Even in this case, since the direction of the virtual camera is changed over a certain time, the difference between the direction of the player character and the direction of the virtual camera can be visually conveyed, making it easier for the user to grasp the positional relationship in the virtual space.

Figure 16:
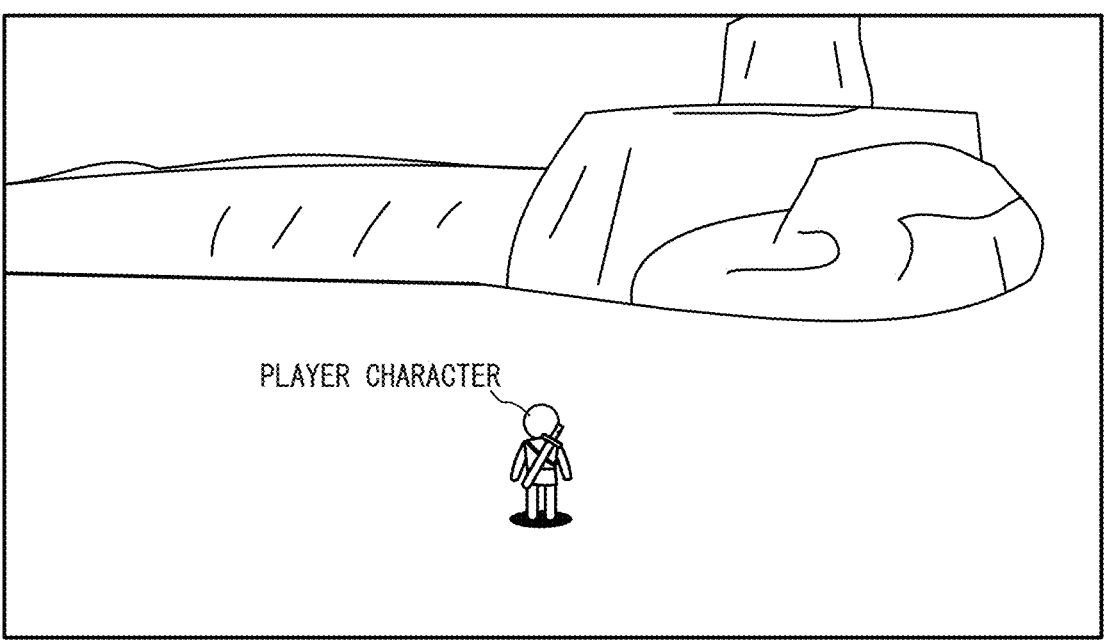
FIG. 16 shows a non-limiting example of the normal screen according to the exemplary embodiment.
Figure 17:
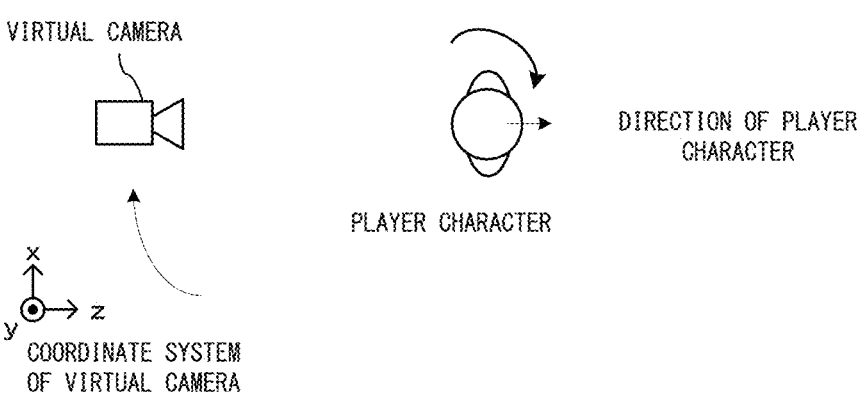
FIG. 17 illustrates the outline of the processing according to the exemplary embodiment.

FIG. 12 to FIG. 17 show examples of the screen when the screen is switched from the map screen to the normal screen by the above automatic rotation instruction operation. FIG. 12 shows an example of the screen immediately after the screen is switched to the normal screen by the automatic rotation instruction operation. FIG. 13 is a schematic diagram showing the relationship between the positions and the directions of the virtual camera and the player character in the screen in FIG. 12 as viewed from above. At this time, the direction of the virtual camera is the direction immediately before the map screen is displayed. After this, the direction of the virtual camera changes, for example, over a time of about one to two seconds such that the virtual camera faces the cursor point. FIG. 14 shows an example of the screen in the middle of turning the direction of the virtual camera toward the cursor point. FIG. 15 is a schematic diagram showing the relationship between the positions and the directions of the virtual camera and the player character in FIG. 14 as viewed from above. At this time, the direction of the virtual camera is not yet facing the cursor point. FIG. 16 shows an example of the screen in a state where the virtual camera is facing the cursor point. FIG. 17 is a schematic diagram showing the relationship between the positions and the directions of the virtual camera and the player character in FIG. 16 as viewed from above. If the direction of the virtual camera becomes the direction to the cursor point as described above, the automatic rotation control ends.

Although not shown, operation guides for the above two operations, the automatic movement instruction operation and the automatic rotation instruction operation, may be displayed on the map screen. In this case, the operation guide for the automatic movement instruction operation may not necessarily be displayed while the cursor is indicating a point for which the automatic movement control cannot be performed.

Simple End Operation

Next, the simple end operation for terminating the map screen by pressing the B-button 54 will be described. In this case, regardless of the position of the cursor on the map screen, the normal screen is displayed without changing the position and the direction of the virtual camera from the state before the map screen is displayed. In other words, the simple end operation is an operation for merely closing the map screen.

Details of Virtual Camera Control Processing of Exemplary Embodiment

Next, the game processing in the exemplary embodiment will described in more detail with reference to FIG. 18 to FIG. 25.

Data to be Used

First, various kinds of data to be used in the processing will be described. FIG. 18 illustrates a memory map showing an example of various kinds of data stored in the DRAM 85 of the main body apparatus 2. In the DRAM 85 of the main body apparatus 2, at least a game program 301, player character data 302, terrain object data 303, virtual camera data 304, operation data 305, a map flag 306, an automatic movement flag 307, automatic movement control data 308, an automatic rotation flag 309, and automatic rotation control data 310 are stored.

The game program 301 is a program for executing game processing including the virtual camera control processing in the exemplary embodiment.

The player character data 302 is data regarding the above player character. The player character data 302 includes position data indicating the position of the player character, data indicating the orientation of the player character, etc.

The terrain object data 303 is data of various terrain objects to be placed in the virtual space. The terrain object data 303 includes an ID for uniquely identifying each terrain object, information indicating the placement position of the terrain object, model data indicating the shape and the appearance of the terrain object, image data, etc.

The virtual camera data 304 is data for controlling the virtual camera. The virtual camera data 304 includes data indicating the position, orientation (depression angle), angle of view, movement speed, etc., of the virtual camera.

The operation data 305 is data obtained from the controller operated by the user. That is, the operation data 305 is data indicating the content of an operation performed by the user. FIG. 19 illustrates an example of the data structure of the operation data 305. The operation data 305 includes at least digital button data 351, right stick data 352, left stick data 353, right inertial sensor data 354, and left inertial sensor data 355. The digital button data 351 is data indicating pressed states of various buttons of the controllers. The right stick data 352 is data for indicating the content of an operation on the right stick 52. Specifically, the right stick data 352 includes two-dimensional data of x and y. The left stick data 353 is data for indicating the content of an operation on the left stick 32. The right inertial sensor data 354 is data indicating the detection results of the inertial sensors such as the acceleration sensor 114 and the angular velocity sensor 115 of the right controller 4. Specifically, the right inertial sensor data 354 includes acceleration data for three axes and angular velocity data for three axes. The left inertial sensor data 355 is data indicating the detection results of the inertial sensors such as the acceleration sensor 104 and the angular velocity sensor 105 of the left controller 3.

Referring back to FIG. 18, the map flag 306 is a flag used to determine whether to display the normal screen or the map screen. If the map screen is to be displayed, the map flag 306 is set to be ON.

The automatic movement flag 307 is a flag used to determine whether or not to execute the above automatic movement control. If the automatic movement flag 307 is ON, it indicates that the automatic movement control is to be performed.

The automatic movement control data 308 is various kinds of data used when the automatic movement control is performed. Specifically, the automatic movement control data 308 includes path information indicating a path to the above cursor point, etc.

The automatic rotation flag 309 is a flag used to determine whether or not to execute the above automatic rotation control. If the automatic rotation flag 309 is ON, it indicates that the automatic rotation control is to be performed.

The automatic rotation control data 310 is data used when the automatic rotation control is performed. The automatic rotation control data 310 includes data indicating a "target direction" which is the direction to the cursor point as viewed from the position of the player character, data indicating the rotation speed per unit time, the movement direction, and the movement speed of the virtual camera during the automatic rotation control, etc.

In addition, various kinds of data required for the game processing, which are not shown, are also stored in the DRAM 85.

Details of Processing Executed by Processor 81

Next, the details of the virtual camera control processing in the exemplary embodiment will be described. In the exemplary embodiment, a flowchart described below is realized by one or more processors reading and executing the above program stored in one or more memories. The flowchart described below is merely an example of the processing. Therefore, the order of each process step may be changed as long as the same result is obtained. In addition, the values of variables and thresholds used in determination steps are also merely examples, and other values may be used as necessary.

FIG. 20 is a flowchart showing the details of the game processing according to the exemplary embodiment. The processing related to the flowchart is repeatedly executed every frame period. It is assumed that prior to the execution of the processing, predetermined terrain objects and the player character have already been placed in the virtual space.

When the game processing starts, first, in step S1, the processor 81 initializes various kinds of data, and takes an image of the virtual space from the position of the virtual camera determined on the basis of the position of the player character. Furthermore, the processor 81 displays the taken image as the above normal screen. Then, the processor 81 waits for an operation from the user.

Next, in step S2, the processor 81 determines whether or not the map flag 306 is ON. As a result of the determination, if the map flag 306 is not ON (NO in step S2), in step S3, the processor 81 performs normal screen processing. On the other hand, if the map flag 306 is ON (YES in step S2), in step S4, the processor 81 performs map screen processing. The details of each processing will be described below.

Normal Screen Processing

Figure 21:
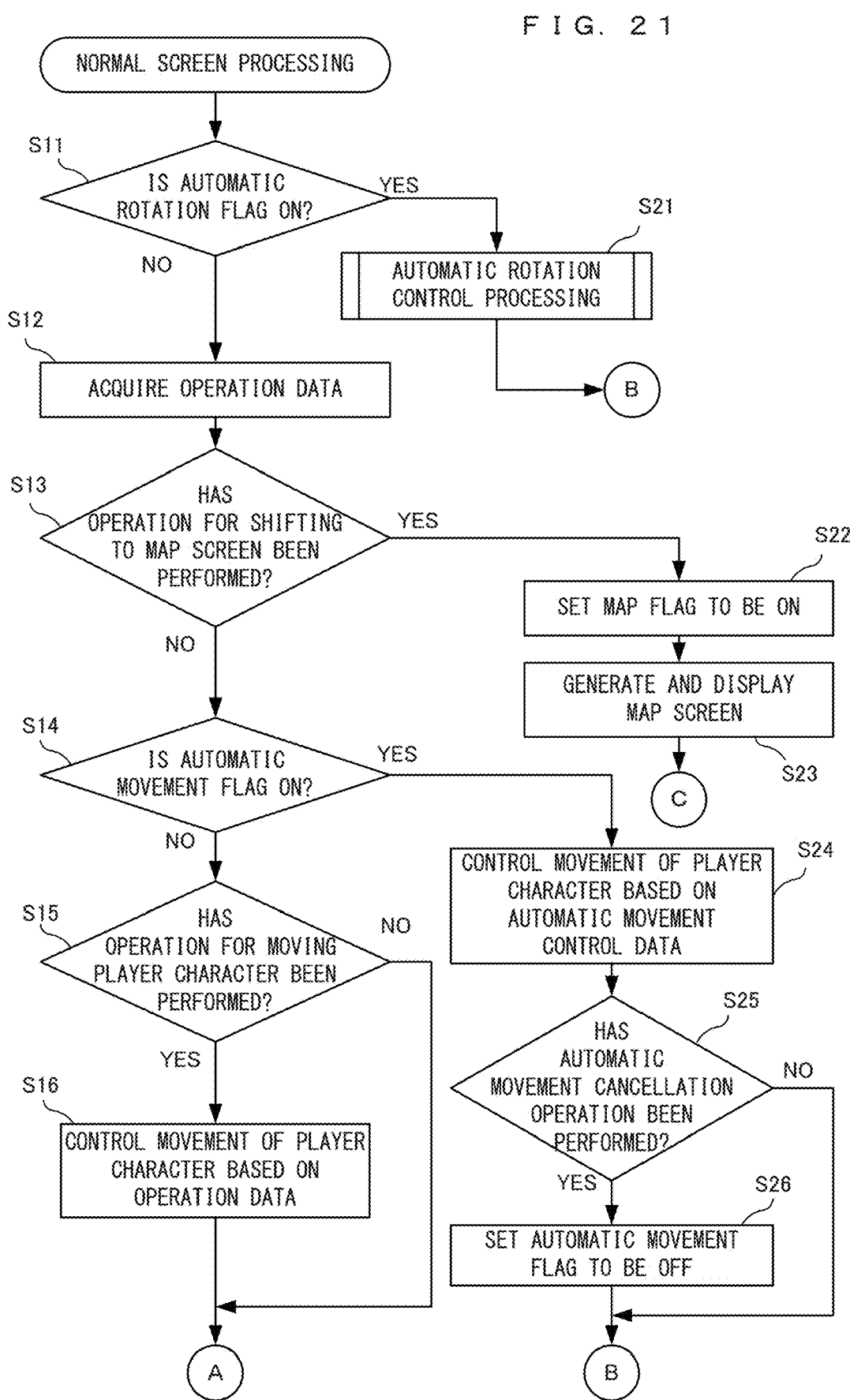
FIG. 21 is a non-limiting example flowchart showing the details of normal screen processing.

FIG. 21 and FIG. 22 are flowcharts showing the details of the normal screen processing in step S3 above. First, in step S11, the processor 81 determines whether or not the automatic rotation flag 309 is ON. As a result of the determination, if the automatic rotation flag 309 is OFF (NO in step S11), in step S12, the processor 81 acquires the operation data 305.

Next, in step S13, the processor 81 determines whether or not an operation for shifting to the map screen has been performed, on the basis of the operation data 305. As a result of the determination, if the operation for shifting to the map screen has not been performed (NO in step S13), next, in step S14, the processor 81 determines whether or not the automatic movement flag 307 is ON. As a result of the determination, if the automatic movement flag 307 is OFF (NO in step S14), next, in step S15, the processor 81 determines whether or not an operation for moving the player character has been performed, on the basis of the operation data 305. If the operation for moving the player character has been performed (YES in step S15), in step S16, the processor 81 controls the movement of the player character on the basis of the operation data 305. On the other hand, if the operation for moving the player character has not been performed (NO in step S15), the process in step S16 above is skipped.

Next, in step S17 in FIG. 22, the processor 81 controls various actions of the player character other than movement on the basis of the operation data 305. For example, the processor 81 controls an attack action, a jump action, etc., of the player character. In addition, the processor 81 also controls the virtual camera on the basis of the virtual camera data 304. For example, if the player character has moved, the processor 81 sets the content of the virtual camera data 304 as appropriate such that the virtual camera follows the player character. Then, the processor 81 changes the position and the direction of the virtual camera on the basis of the virtual camera data 304.

Next, in step S18, the processor 81 controls actions of various objects other than the player character.

Next, in step S19, the processor 81 takes an image of the virtual space by the virtual camera. Furthermore, the processor 81 generates a game image to be displayed as the above normal screen, on the basis of the taken image. Then, the processor 81 outputs the game image to the display 12 or a stationary monitor or the like. Thereafter, the processor 81 ends the normal screen processing.

Automatic Rotation Control

Next, processing performed if, as a result of the determination in step S11 above, the automatic rotation flag 309 is ON (YES in step S11), will be described. In this case, the current state is considered to be a state after the display of the map screen is ended by the automatic rotation instruction operation. Therefore, in step S21, the processor 81 executes automatic rotation control processing for performing the automatic rotation control as described above.

Figure 23:
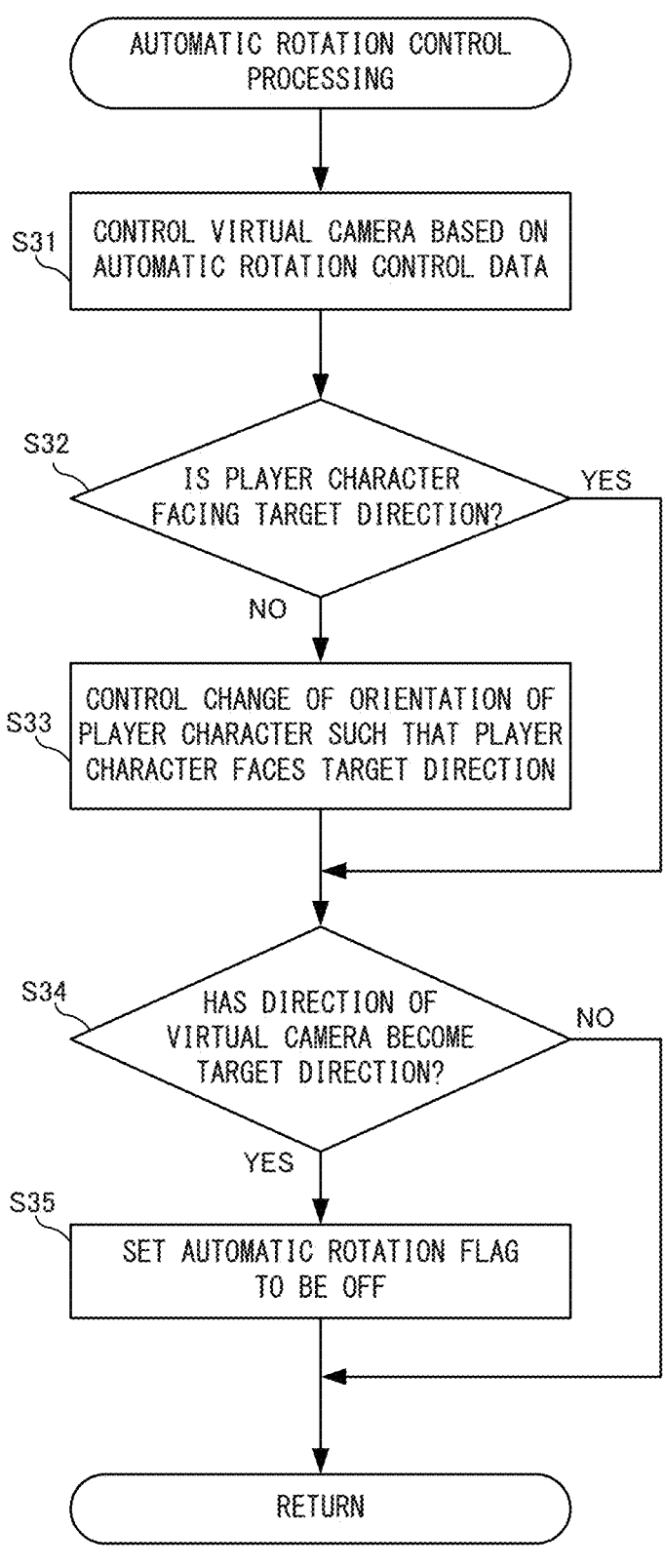
FIG. 23 is a non-limiting example flowchart showing the details of automatic rotation control processing.

FIG. 23 is a flowchart showing the details of the automatic rotation control processing. First, in step S31, the processor 81 controls the virtual camera on the basis of the automatic rotation control data 310. That is, the processor 81 changes the direction and the position of the virtual camera on the basis of the automatic rotation control data 310.

Next, in step S32, the processor 81 determines whether or not the front side of the player character is facing the above target direction. As a result of the determination, if the front side of the player character is not facing the target direction (NO in step S32), in step S33, the processor 81 changes the orientation of the player character such that the player character faces the target direction. On the other hand, if the front side of the player character is facing the target direction (YES in step S32), the process in step S33 above is skipped.

Next, in step S34, the processor 81 determines whether or not the direction of the virtual camera has become the above target direction. As a result of the determination, if the direction of the virtual camera has become the target direction (YES in step S34), in step S35, the processor 81 sets the automatic rotation flag 309 to be OFF. On the other hand, if the direction of the virtual camera has not become the target direction (NO in step S34), the process in step S35 above is skipped.

Then, the processor 81 ends the automatic rotation control processing.

Referring back to FIG. 21, after the automatic rotation control processing is ended, the processor 81 advances the processing to step S18 above. Here, in the exemplary embodiment, no operation from the user is accepted during the automatic rotation control. In this regard, in another exemplary embodiment, an operation from the user may be accepted even during the automatic rotation control. In addition, in this case, if an operation for changing the orientation of the virtual camera is detected as an operation performed by the user, the automatic rotation control may be suspended at that time, and the orientation of the virtual camera may be changed on the basis of the content of the operation performed by the user.

Processing of Shifting to Map Screen

Next, processing performed if, as a result of the determination in step S13 above, the operation for shifting to the map screen has been performed (YES in step S13), will be described. In this case, in step S22, the processor 81 sets the map flag 306 to be ON. Next, in step S23, the processor 81 generates and displays a map screen as described above, on the basis of the current position of the player character. For example, the processor 81 determines the display range of the map image on the map screen such that the display position of the player icon is at substantially the center of the map screen. Then, the processor 81 displays the map image in the determined range. Then, the processor 81 ends the normal screen processing.

Automatic Movement Control

Next, processing performed if, as a result of the determination in step S14 above, the automatic movement flag 307 is ON (YES in step S14), will be described. In this case, the current state is considered to be a state after the display of the map screen is ended by the automatic movement instruction operation. In this case, first, in step S24, the processor 81 moves the player character on the basis of the automatic movement control data 308. Furthermore, the processor 81 controls the virtual camera such that the virtual camera moves so as to follow the player character from behind.

Next, in step S25, the processor 81 determines whether or not the automatic movement cancellation operation has been performed, on the basis of the operation data 305. As a result of the determination, if the automatic movement cancellation operation has been performed (YES in step S25), in step S26, the processor 81 sets the automatic movement flag 307 to be OFF. Furthermore, the processor 81 stops the movement of the player character. Then, the processor 81 advances the processing to step S18 above. On the other hand, if the automatic movement cancellation operation has not been performed (NO in step S25), the process in step S26 above is skipped. Then, the processor 81 advances the processing to step S18 above.

In the exemplary embodiment, the example in which no operation other than the automatic movement cancellation operation is accepted during the automatic movement control has been described. In this regard, in another exemplary embodiment, actions other than movement may be enabled even during the automatic movement control.

This is the end of the detailed description of the normal screen processing.

Map Screen Processing

Next, the details of the map screen processing in step S4 above will be described. FIG. 24 and FIG. 25 are flowcharts showing the details of the map screen processing. First, in step S41, the processor 81 acquires the operation data 305. Next, in step S42, the processor 81 determines whether or not an operation for moving the above cursor has been performed, on the basis of the operation data 305. As a result of the determination, if the operation for moving the cursor has been performed (YES in step S42), in step S43, the processor 81 moves the cursor on the map screen according to the content of the operation. At this time, the coordinates of the cursor on the map screen are temporarily stored in the DRAM 85. Then, the processor 81 advances the processing to step S58 described later.

On the other hand, as a result of the determination in step S42 above, if the operation for moving the cursor has not been performed (NO in step S42), in step S44, the processor 81 determines whether or not an operation for scrolling the map screen has been performed, on the basis of the operation data 305. If the scrolling operation has been performed (YES in step S44), in step S45, the processor 81 scrolls the map screen according to the content of the operation. Accordingly, the user is allowed to designate, for example, a point that is not displayed on the normal screen, or a point that is far away from the current position of the player character, with the cursor. Then, the processor 81 advances the processing to step S58 described later.

On the other hand, as a result of the determination in step S44 above, if the scrolling operation has not been performed (NO in step S44), in step S46, the processor 81 determines whether or not the automatic rotation instruction operation has been performed, on the basis of the operation data 305. In this example, whether or not the ZL-button 39 has been pressed is determined. As a result of the determination, if the automatic rotation instruction operation has been performed (YES in step S46), in step S47, the processor 81 sets the automatic rotation flag 309 to be ON.

Next, in step S48, the processor 81 determines the above target direction on the basis of the coordinates of the cursor on the map screen. Specifically, the processor 81 calculates the position, in the virtual space, corresponding to the coordinates of the cursor on the map screen, as the above cursor point. Next, the processor 81 determines the above target direction on the basis of the current position of the player character in the virtual space and the above cursor point.

Next, in step S49, the processor 81 sets the automatic rotation control data 310 on the basis of the above target direction. Specifically, the processor 81 calculates an amount of change in direction per unit time such that the direction of the virtual camera changes from the current direction to the target direction over a predetermined time. In addition, as described above, as the direction of the virtual camera changes, the processor 81 changes the position of the virtual camera, so that the processor 81 also calculates an amount of movement per unit time for the virtual camera. Then, the processor 81 sets data indicating the calculation results, as the automatic rotation control data 310. Then, the processor 81 advances the processing to step S55 described later.

On the other hand, as a result of the determination in step S46 above, if the automatic rotation instruction operation has not been performed (NO in step S46), in step S50 in FIG. 25, the processor 81 determines whether or not the automatic movement instruction operation has been performed, on the basis of the operation data 305. In this example, whether or not the A-button 53 has been pressed is determined. As a result of the determination, if the automatic movement instruction operation has been performed (YES in step S50), in step S51, the processor 81 determines whether or not the cursor point is at a location to which the player character can move. As a result of the determination, if the cursor point is not at a location to which the player character can move (NO in step S51), in step S52, the processor 81 performs setting for displaying a message indicating that the automatic movement control cannot be performed. Then, the processor 81 advances the processing to step S58 described later.

On the other hand, if the cursor point is at a location to which the player character can move (YES in step S51), in step S53, the processor 81 sets the automatic movement control data 308 on the basis of the coordinates of the cursor on the map screen. Specifically, the processor 81 calculates the above cursor point on the basis of the coordinates of the cursor. Next, the processor 81 calculates the path from the current position of the player character to reach the cursor point. Then, the processor 81 sets information indicating this path, as the automatic movement control data 308.

Next, in step S54, the processor 81 sets the automatic movement flag 307 to be ON.

Next, in step S55, the processor 81 terminates the map screen and displays the normal screen. The normal screen displayed at this time is based on an image taken at the position and the direction of the virtual camera that are immediately before the map screen is displayed.

Next, in step S56, the processor 81 sets the map flag 306 to be OFF. Then, the processor 81 ends the map screen processing.

On the other hand, as a result of the determination in step S50 above, if the automatic movement instruction operation has not been performed (NO in step S50), in step S57, the processor 81 determines whether or not the above simple end operation has been performed, on the basis of the operation data 305. In this example, whether or not the B-button 54 has been pressed is determined. As a result of the determination, if the simple end operation has been performed (YES in step S57), the processor 81 advances the processing to step S55 above. As a result, the map screen is terminated. On the other hand, if the simple end operation has not been performed (NO in step S57), in step S58, the processor 81 displays the map screen. At this time, if a message indicating that the automatic movement control cannot be performed has been set to be displayed in step S52 above, this message is also displayed on the map screen. In addition, if the cursor has been moved or a screen scrolling operation has been performed, the map screen reflecting the content of this operation is displayed. Then, the processor 81 ends the map screen processing.

Referring back to FIG. 20, if the normal screen processing or the map screen processing is ended, next in step S5, the processor 81 determines whether or not a condition for ending the game has been satisfied. For example, whether or not an operation for ending the game has been performed is determined. As a result of the determination, if the condition for ending the game has not been satisfied (NO in step S5), the processor 81 returns to step S2 above and repeats the processing. If the condition for ending the game has been satisfied (YES in step S5), the processor 81 ends the game processing.

This is the end of the detailed description of the game processing according to the exemplary embodiment.

As described above, in the exemplary embodiment, in the game in which it is possible to switch between the normal screen and the map screen as described above, when the screen returns from the map screen to the normal screen, control in which the direction of the virtual camera is turned toward a point designated on the map screen is performed. In addition, a state where the direction is not instantly changed but is changed over a certain time is shown to the user. This allows the user to grasp how the imaging direction has changed.

In the case of performing the game processing using touch operations on a hand-held information processing apparatus such as a smartphone, for example, operations such as changing the imaging direction of the virtual camera with a touch operation and returning the imaging direction to the original direction with a touch-off operation may be employed. Assuming such operations, it may be difficult to grasp which direction the virtual camera is facing when the direction of the virtual camera is changed, since the display screen is relatively small in size and the screen may be hidden by fingers during touch operations, for example. In this regard, the processing of the exemplary embodiment makes it easier to grasp how the direction of the virtual camera has been changed, so that the processing as in the exemplary embodiment is also useful for game processing using touch operations such as those described above, etc.

In addition, by moving the cursor on the map screen displaying the virtual space as viewed from above, the direction in which the virtual camera faces can be designated, so that the direction in which it is desired to cause the virtual camera to face can be designated accurately and easily.

Modifications

In the above embodiment, the frustum image is displayed on the map screen. The frustum image is controlled so as to face the position of the cursor on the map screen, and, from this, it can be said that the frustum image indicates the direction of the virtual camera (the above target direction) by the automatic rotation control. In this regard, in another exemplary embodiment, the frustum image may be directly rotatable around a user icon, for example, by operating the right stick 52. For example, by making the frustum image operable on the basis of an operation performed by the user without using a cursor as described above on the map screen, it is made possible for the user to directly designate the above target direction.

In addition, the image indicating the direction of the virtual camera on the map screen is not limited to the fan-shaped frustum image as described above, and, for example, an arrow image or the like may be used.

In the above embodiment, the game processing in which the above normal screen is a third-person viewpoint screen has been exemplified, but the above-described processing can also be applied to information processing in which the above normal screen is a first-person viewpoint screen. In the case of a first-person viewpoint screen, as the above automatic rotation control, control in which the position of the virtual camera is not changed and only the angle of the yaw component is changed, may be performed.

In the above example, the direction of the virtual camera on the normal screen is substantially horizontal to the ground. The present disclosure is not limited thereto, and in another exemplary embodiment, the direction of the virtual camera on the normal screen may be any direction as long as the direction of the virtual camera is a direction other than the vertical direction (directly downward direction).

In the case of a game in which the direction of the virtual camera can be the vertically downward direction on the normal screen, the following processing may be performed. For example, game processing in which the position and the orientation of the virtual camera can be controlled on the normal screen by an operation performed by the user, is assumed. In such a game, by moving the virtual camera upward in the virtual space while the player character is set as the gazing point, the direction of the virtual camera is changed to the vertically downward direction, and as a result, the normal screen may be a screen displaying the virtual space as viewed from above as shown in FIG. 26. It is assumed that such a virtual camera operation is possible, and that in a state where the normal screen is a screen as viewed from above, the screen shifts to the above map screen, and returns to the normal screen by the above automatic rotation instruction operation. In this case, as shown in FIG. 27, the virtual camera may be rotated such that the above target direction becomes the upward direction in a screen coordinate system. The example in FIG. 27 is an example of the case where a point in the rightward direction in FIG. 26 above is designated as a cursor point. That is, if the direction of the virtual camera is the vertically downward direction when the screen shifts to the map screen, control may be performed such that the virtual camera is rotated around the z-axis, that is, the angle of the pitch component is changed, when the screen returns to the normal screen by the automatic rotation instruction operation. If the direction of the virtual camera is a direction other than the vertically downward direction when the screen shifts to the map screen, the virtual camera may be rotated around the y-axis using the same processing as described above.

In the above embodiment, the case where the series of processes related to the game processing is performed in the single main body apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the main body apparatus 2 may be configured to send operation data indicating a user's operation to a predetermined server, and the server may be configured to execute various kinds of game processing and stream the execution results as video/audio to the main body apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A non-transitory computer-readable storage medium having stored therein an information processing program causing one or more processors to execute processing of moving a player object in a virtual space on the basis of an operation performed by a user, taking an image of the virtual space by a virtual camera, and rendering the virtual space, the information processing program causing the one or more processors to provide execution comprising:

performing first display obtained by taking an image of the virtual space by the virtual camera facing a first camera direction in the virtual space and rendering the virtual space;

during the first display, accepting input based on an operation performed by the user and switching from the first display to second display, wherein the second display represents the virtual space as viewed from above;

during the second display that represents the virtual space as viewed from above, determining a cursor location for a cursor displayed during the second display and designating a second camera direction on the basis of an operation performed, by the user, in association with the cursor location, wherein the second camera direction is a direction on the second display;

during the second display, switching to the first display according to an operation performed by the user;

during a predetermined period after switching to the first display, changing a direction of the virtual camera from the first camera direction to a direction based on the second camera direction determined based on the cursor location for the cursor displayed during the second display; and rendering the virtual space for display, on a display device, in association with the changed direction of the virtual camera.

2. The non-transitory computer-readable storage medium according to claim 1, wherein the second display is of a planar image representing terrain of the virtual space when the virtual space is viewed from above.

3. The non-transitory computer-readable storage medium according to claim 1, wherein the second camera direction is determined by the user designating a point in the virtual space and performing a first operation during the second display.

4. The non-transitory computer-readable storage medium according to claim 3, wherein the second camera direction is from a position of the player object toward the point in the virtual space designated by the user.

5. The non-transitory computer-readable storage medium according to claim 4, wherein, during the second display, in association with the point in the virtual space designated by the user being a point that cannot be reached by the player object, acceptance of the first operation is restricted.

6. The non-transitory computer-readable storage medium according to claim 3, wherein a second operation is selectively accepted with the first operation during the second display, and in association with a point in the virtual space being designated and the second operation being performed, the player object is moved to the designated point after switching from the second display to the first display.

7. The non-transitory computer-readable storage medium according to claim 1, wherein a part of the virtual space is displayed in the second display, and a display range of the virtual space is changed according to an operation performed by the user.

8. The non-transitory computer-readable storage medium according to claim 1, wherein a direction image indicating an imaging direction of the virtual camera is displayed in the second display, and a display position of the direction image is changed such that a direction indicated by the direction image is changed according to an operation performed by the user.

9. The non-transitory computer-readable storage medium according to claim 1, wherein the player object is set as a gazing point of the virtual camera in the first display, and the virtual camera is rotated from the first camera direction to the direction based on the second camera direction such that only an angle of a yaw component thereof, which is a component corresponding to an imaging direction of the virtual camera, is changed and a pitch component and a roll component thereof are not changed.

10. The non-transitory computer-readable storage medium according to claim 1, wherein the first camera direction is a predetermined direction that is not a vertically downward direction in the virtual space.

11. The non-transitory computer-readable storage medium according to claim 1, wherein the player object is controlled so as to follow the changing direction of the virtual camera.

12. An information processing system, comprising:

one or more processors configured to execute processing of moving a player object in a virtual space on the basis of an operation performed by a user, taking an image of the virtual space by a virtual camera, and rendering the virtual space, wherein the one or more processors are further configured to:

perform first display obtained by taking an image of the virtual space by the virtual camera facing a first camera direction in the virtual space and rendering the virtual space;

during the first display, accept input based on an operation performed by the user and switch from the first display to second display, wherein the second display represents the virtual space as viewed from above;

during the second display that represents the virtual space as viewed from above, determine a cursor location for a cursor displayed during the second display and designate a second camera direction on the basis of an operation performed, by the user, in association with the cursor location, wherein the second camera direction is a direction on the second display;

during the second display, switching to the first display according to an operation performed by the user;

during a predetermined period after switching to the first display, change a direction of the virtual camera from the first camera direction to a direction based on the second camera direction determined based on the cursor location for the cursor displayed during the second display; and render the virtual space for display, on a display device, in association with the changed direction of the virtual camera.

13. The information processing system according to claim 12, wherein the player object is controlled so as to follow the changing direction of the virtual camera.

14. An information processing method for causing one or more processors to execute processing of moving a player object in a virtual space on the basis of an operation performed by a user, taking an image of the virtual space by a virtual camera, and rendering the virtual space, the information processing method comprising:

performing first display obtained by taking an image of the virtual space by the virtual camera facing a first camera direction in the virtual space and rendering the virtual space;

during the first display, accepting inpat based on an operation performed by the user and switching from the first display to second display, wherein the second display represents the virtual space as viewed from above;

during the second display that represents the virtual space as viewed from above, determining a cursor location for a cursor displayed during the second display and designating a second camera direction on the basis of an operation performed by the user, in association with the cursor location, wherein the second camera direction is a direction on the second display;

during the second display, switching to the first display according to an operation performed by the user;

during a predetermined period after switching to the first display, changing a direction of the virtual camera from the first camera direction to a direction based on the second camera direction determined based on the cursor location for the cursor displayed during the second display; and rendering the virtual space for display, on a display device, in association with the changed direction of the virtual camera.

15. The method according to claim 14, wherein the player object is controlled so as to follow the changing direction of the virtual camera.

* * * * *